(12) United States Patent
Stamps et al.

(10) Patent No.: US 12,319,406 B2
(45) Date of Patent: Jun. 3, 2025

(54) VIBRATION ISOLATION SYSTEMS FOR COMPOUND HELICOPTERS

(71) Applicant: Textron Innovations Inc., Providence, RI (US)

(72) Inventors: Frank Bradley Stamps, Colleyville, TX (US); Michael Reaugh Smith, Colleyville, TX (US); Bradley Joseph Passe, Irving, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/438,266

(22) Filed: Feb. 9, 2024

(65) Prior Publication Data
US 2024/0246664 A1 Jul. 25, 2024

Related U.S. Application Data

(60) Division of application No. 17/154,925, filed on Jan. 21, 2021, now Pat. No. 11,932,380, which is a continuation-in-part of application No. 16/716,264, filed on Dec. 16, 2019, now Pat. No. 11,214,362.
(Continued)

(51) Int. Cl.
*B64C 27/00* (2006.01)
*B64C 1/06* (2006.01)
*B64C 27/10* (2023.01)
*B64C 27/22* (2006.01)
(Continued)

(52) U.S. Cl.
CPC ............ *B64C 27/001* (2013.01); *B64C 1/065* (2013.01); *B64C 27/10* (2013.01); *B64C 27/22* (2013.01); *B64C 27/26* (2013.01); *F16F 15/167* (2013.01); *B64C 2027/002* (2013.01);
(Continued)

(58) Field of Classification Search
CPC .................. B64C 27/001; B64C 2027/002
See application file for complete search history.

(56) References Cited

U.S. PATENT DOCUMENTS

| 3,514,054 A | 5/1970 | Mard et al. |
| 3,635,427 A | 1/1972 | Balke |
| 3,698,663 A | 10/1972 | Rodney et al. |

(Continued)

OTHER PUBLICATIONS

Advancing Blade Concept (ABC) Technology Demonstrator, Applied Technology Laboratory—U.S. Army Research and Technology Laboratories, Apr. 1981.
(Continued)

*Primary Examiner* — Joseph W Sanderson
(74) *Attorney, Agent, or Firm* — Lawrence Youst PLLC

(57) ABSTRACT

A compound helicopter includes a fuselage including a fuselage airframe, a translational thrust system coupled to the fuselage airframe and a pylon assembly subject to vibration. The pylon assembly includes a transmission and a rotor system having a main rotor assembly. The compound helicopter also includes a main rotor vibration isolation system including a plurality of augmented liquid inertia vibration eliminator units each having an isolation frequency and each coupled between the fuselage airframe and the pylon assembly to reduce transmission of the pylon assembly vibration to the fuselage airframe at the isolation frequency. Each augmented liquid inertia vibration eliminator unit includes at least one active tuning element movable to tune the isolation frequency thereof.

11 Claims, 21 Drawing Sheets

Related U.S. Application Data which is a continuation of application No. 15/459,781, filed on Mar. 15, 2017, now abandoned.

(51) Int. Cl.
 *B64C 27/26* (2006.01)
 *F16F 15/167* (2006.01)

(52) U.S. Cl.
 CPC ..... *F16F 2222/08* (2013.01); *F16F 2228/066* (2013.01); *F16F 2230/18* (2013.01)

(56) References Cited

U.S. PATENT DOCUMENTS

| | | | |
|---|---|---|---|
| 4,236,607 A | 12/1980 | Halwes et al. | |
| 4,720,060 A | 1/1988 | Yana | |
| 4,974,794 A | 12/1990 | Aubry et al. | |
| 5,310,137 A | 5/1994 | Yoerkie, Jr. et al. | |
| 5,316,240 A | 5/1994 | Girard et al. | |
| 5,435,531 A | 7/1995 | Smith et al. | |
| 5,439,082 A | 8/1995 | McKeown et al. | |
| 5,788,182 A | 8/1998 | Guimbal | |
| 6,009,983 A | 1/2000 | Stamps et al. | |
| 6,431,530 B1 | 8/2002 | Stamps et al. | |
| 6,695,106 B2 | 2/2004 | Smith et al. | |
| 7,648,338 B1 | 1/2010 | Welsh | |
| 7,719,416 B2 | 5/2010 | Arms et al. | |
| 7,857,255 B2 | 12/2010 | Pancotti et al. | |
| 8,328,129 B2 | 12/2012 | Smith et al. | |
| 8,499,907 B2 | 8/2013 | Smith et al. | |
| 8,622,375 B2 * | 1/2014 | Bosworth | B64C 27/51 |
| | | | 267/140.11 |
| 8,840,062 B2 | 9/2014 | Smith et al. | |
| 9,145,946 B2 | 9/2015 | David et al. | |
| 9,249,856 B1 | 2/2016 | Lee et al. | |
| 9,254,914 B2 | 2/2016 | Hendricks et al. | |
| 9,365,294 B2 | 6/2016 | Griffin et al. | |
| 9,399,508 B2 | 7/2016 | Lakic et al. | |
| 9,446,841 B2 | 9/2016 | Smith et al. | |
| 9,771,150 B2 | 9/2017 | Smith et al. | |
| 9,777,788 B2 | 10/2017 | Lee et al. | |
| 10,330,166 B2 | 6/2019 | Lee et al. | |
| 11,203,418 B2 | 12/2021 | Stamps et al. | |
| 11,214,362 B2 * | 1/2022 | Foskey | B64C 27/001 |
| 11,932,380 B2 * | 3/2024 | Stamps | B64C 27/10 |
| 2002/0060268 A1 | 5/2002 | Smith et al. | |
| 2002/0128072 A1 | 9/2002 | Terpay et al. | |
| 2006/0151272 A1 | 7/2006 | Smith et al. | |
| 2008/0036617 A1 | 2/2008 | Arms et al. | |
| 2008/0142633 A1 | 6/2008 | McGuire et al. | |
| 2009/0321556 A1 | 12/2009 | Pancotti et al. | |
| 2010/0090055 A1 | 4/2010 | Smith et al. | |
| 2011/0259687 A1 | 10/2011 | Smith et al. | |
| 2013/0105621 A1 | 5/2013 | Smith et al. | |
| 2013/0119591 A1 | 5/2013 | Lee et al. | |
| 2013/0241124 A1 * | 9/2013 | Bosworth | B64C 27/51 |
| | | | 267/140.13 |
| 2013/0270415 A1 | 10/2013 | Lee et al. | |
| 2013/0306420 A1 | 11/2013 | Smith et al. | |
| 2014/0314563 A1 | 10/2014 | Mayrides et al. | |
| 2015/0097076 A1 | 4/2015 | Lakic et al. | |
| 2015/0125299 A1 | 5/2015 | Baskin et al. | |
| 2015/0136900 A1 | 5/2015 | Griffin et al. | |
| 2015/0139800 A1 | 5/2015 | Hendricks et al. | |
| 2015/0289056 A1 | 10/2015 | Storm et al. | |
| 2015/0308534 A1 | 10/2015 | Smith et al. | |
| 2016/0200432 A1 | 7/2016 | Darrow, Jr. et al. | |
| 2017/0225774 A1 | 8/2017 | Welsh et al. | |
| 2018/0038439 A1 | 2/2018 | Lee et al. | |
| 2018/0265186 A1 | 9/2018 | Foskey et al. | |
| 2020/0262549 A1 | 8/2020 | Foskey et al. | |
| 2020/0398976 A1 | 12/2020 | Stamps et al. | |
| 2021/0403148 A1 * | 12/2021 | Stamps | B64C 27/10 |

OTHER PUBLICATIONS

Go et al., Performance and Vibration Analyses of Lift-Offset Helicopters, International Journal of Aerospace Engineering, vol. 2017, Jun. 15, 2017.

Hager, The Need for High Speed in Next Generation Rotorcraft, U.S. Army War College, Mar. 2012.

S-69 (XH-59A) Advancing Blade Concept Demonstrator, Sikorsky Archives, https://www.sikorskyarchives.com/S-69%20(XH-59A).php, Apr. 2012.

* cited by examiner

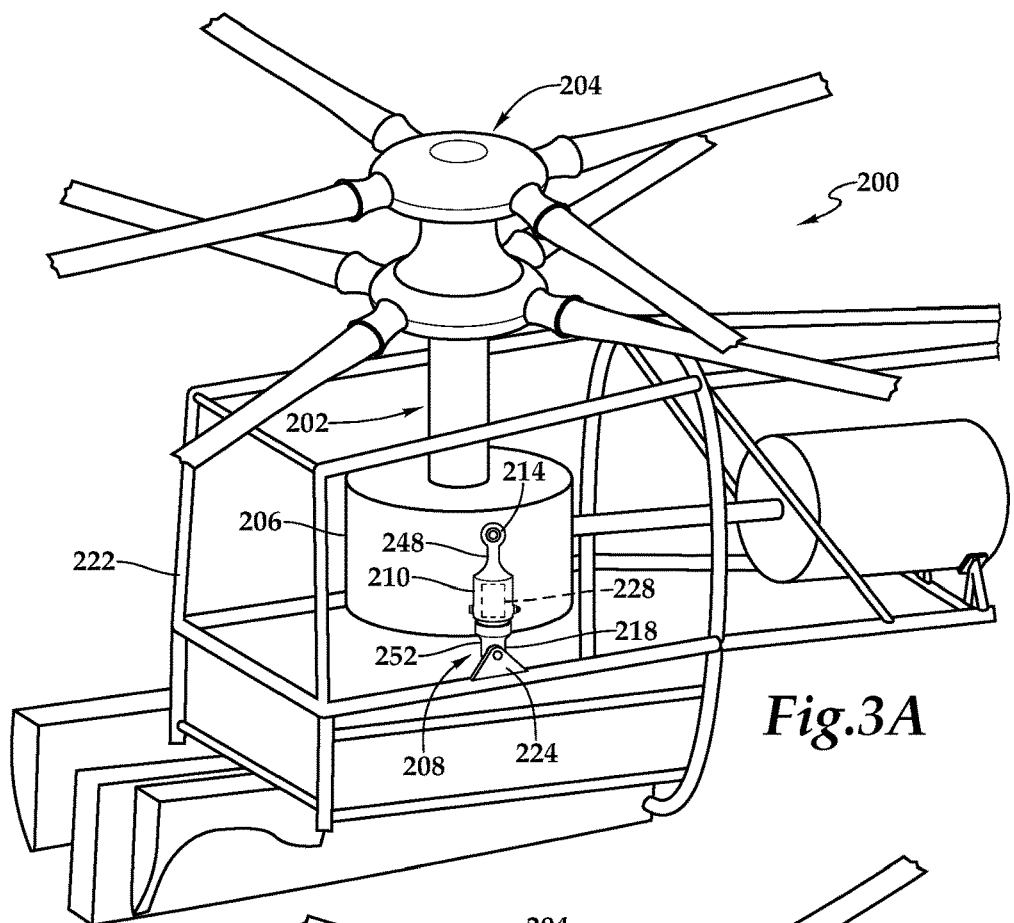
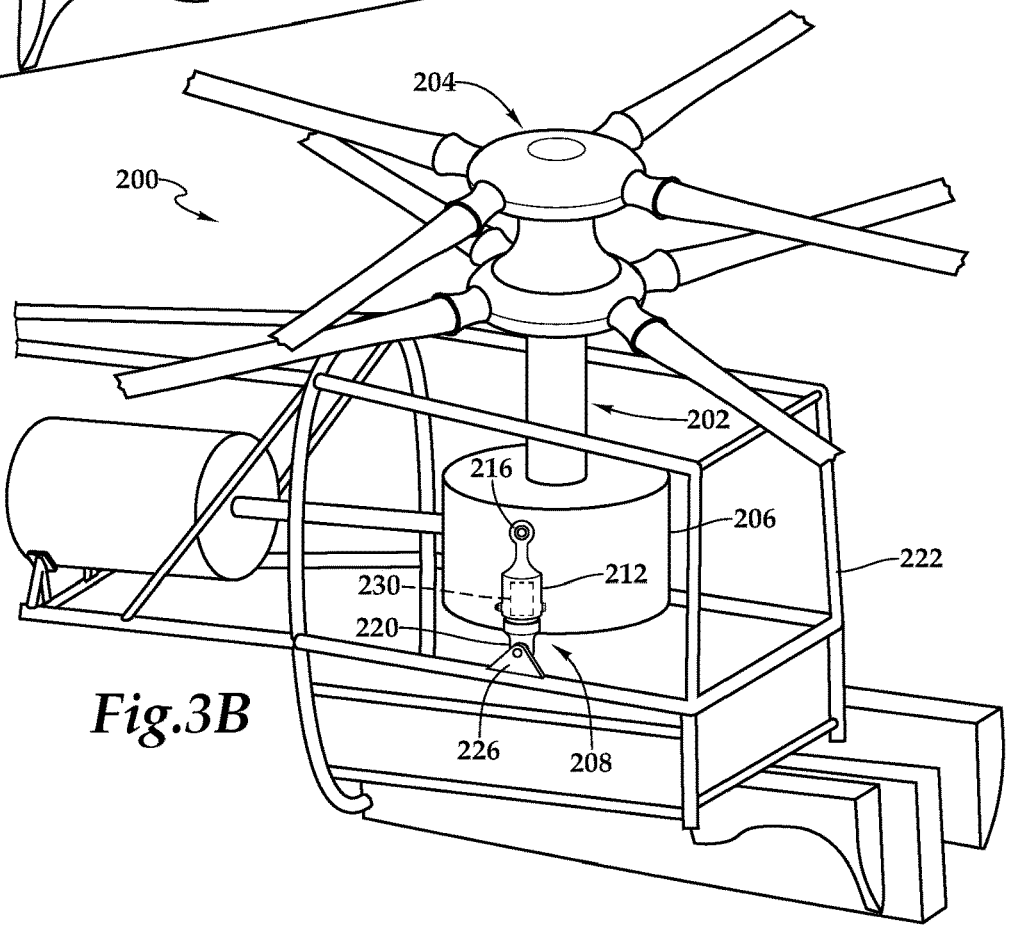

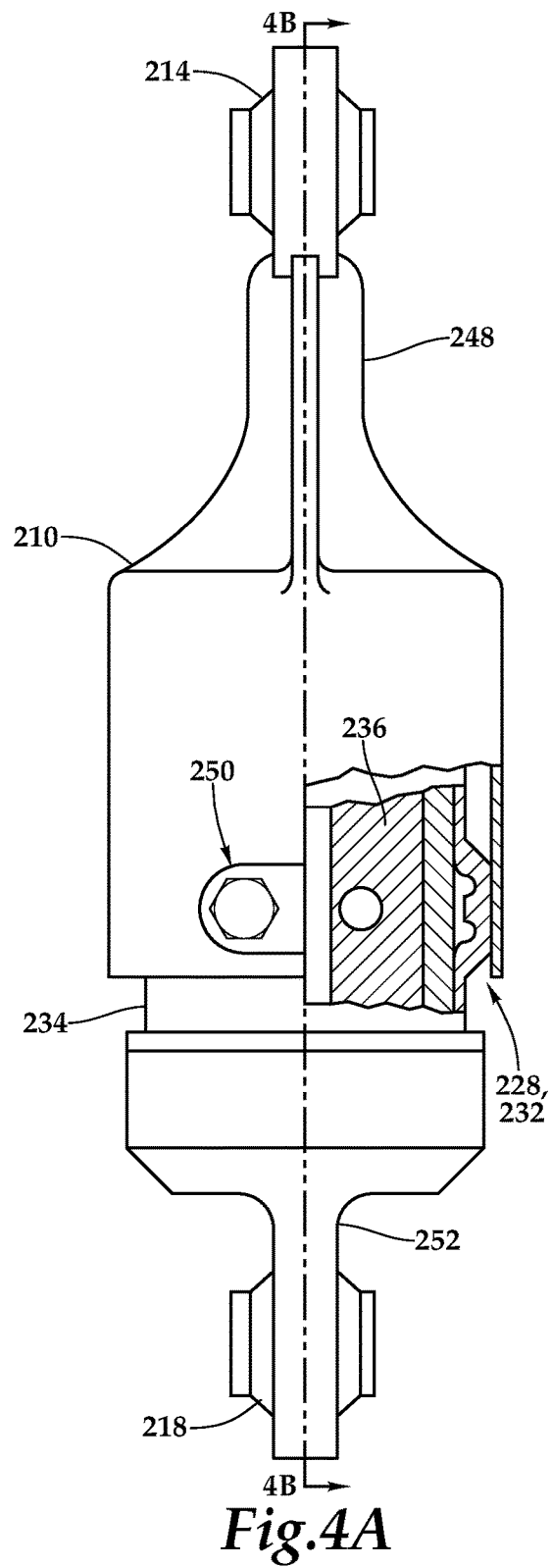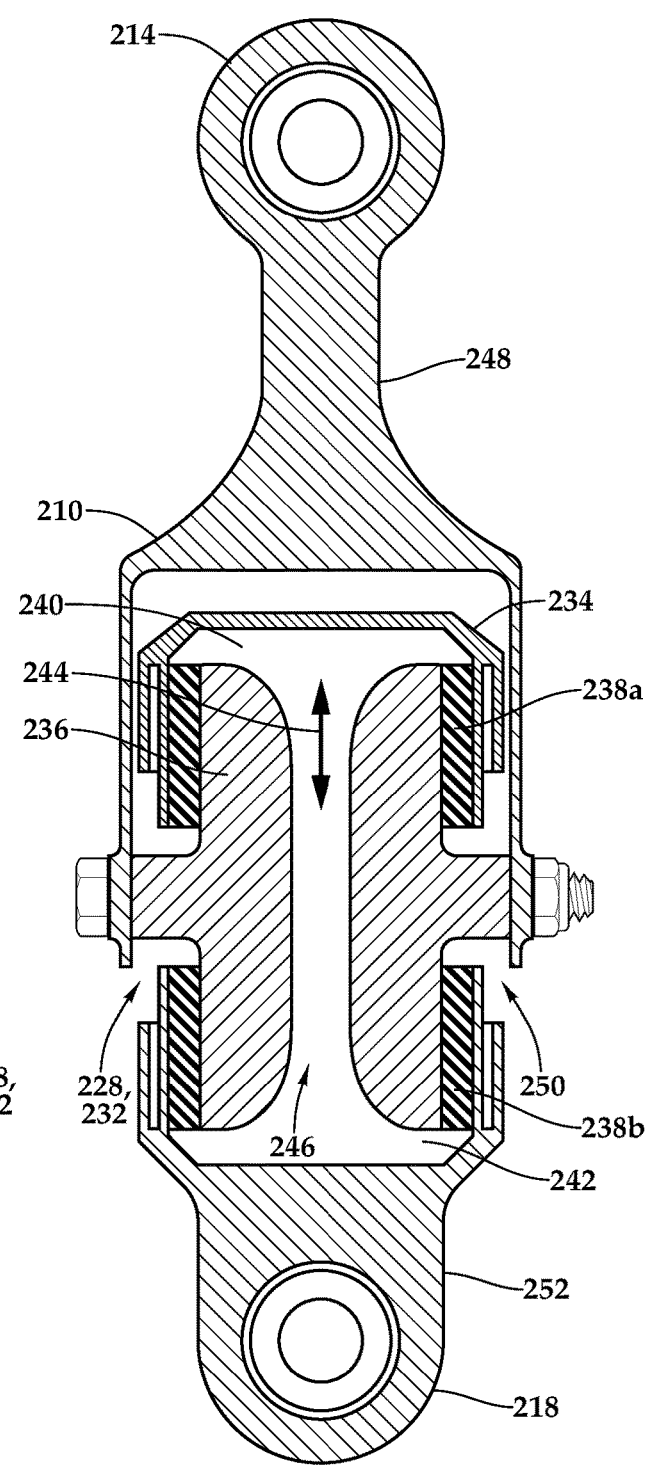
*Fig.4A*  *Fig.4B*

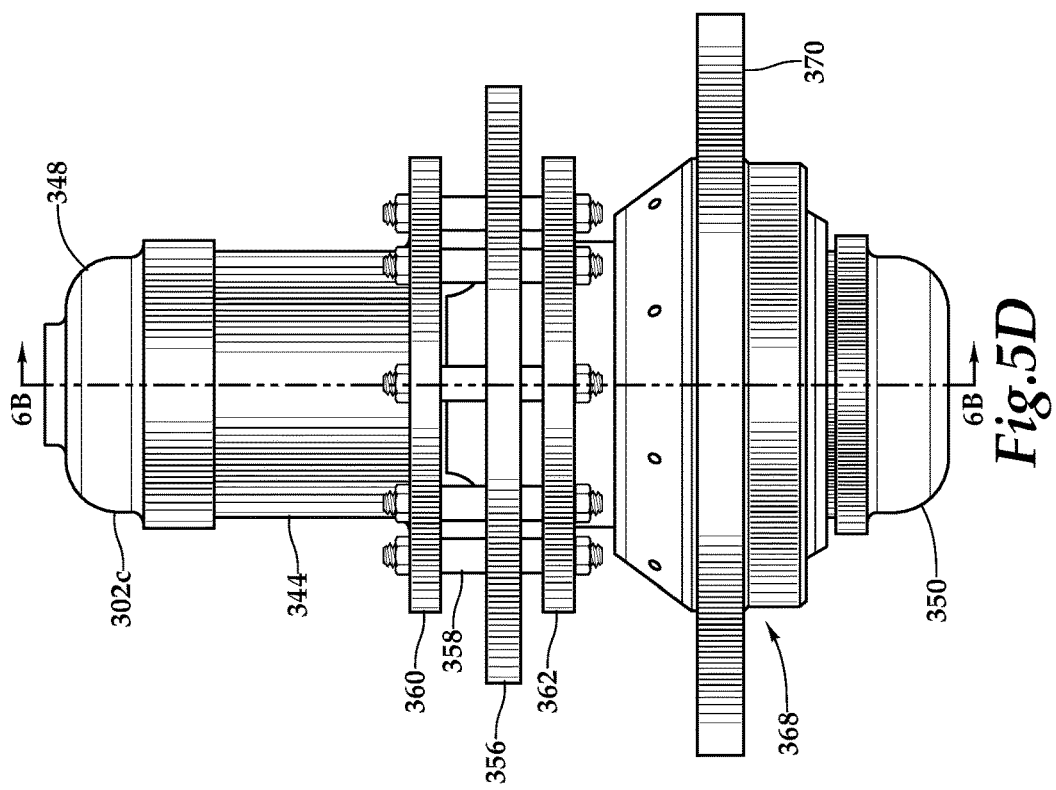
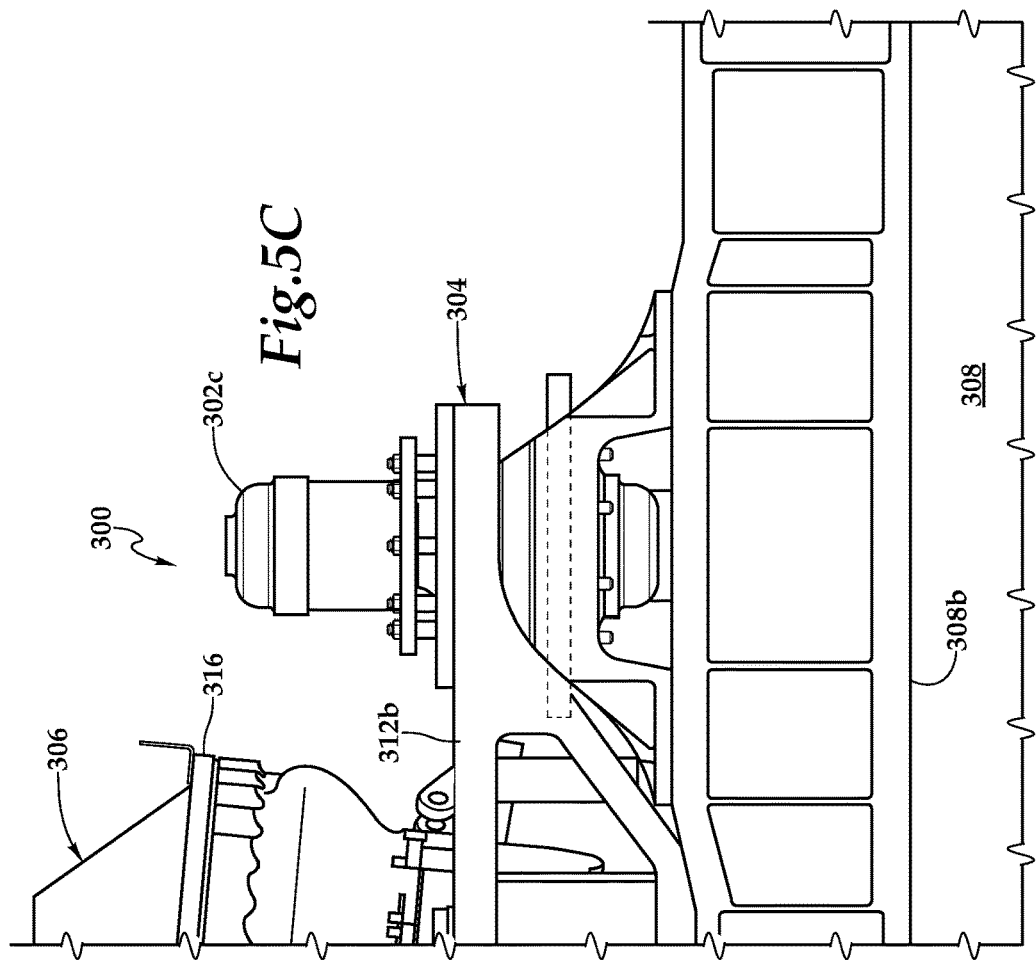

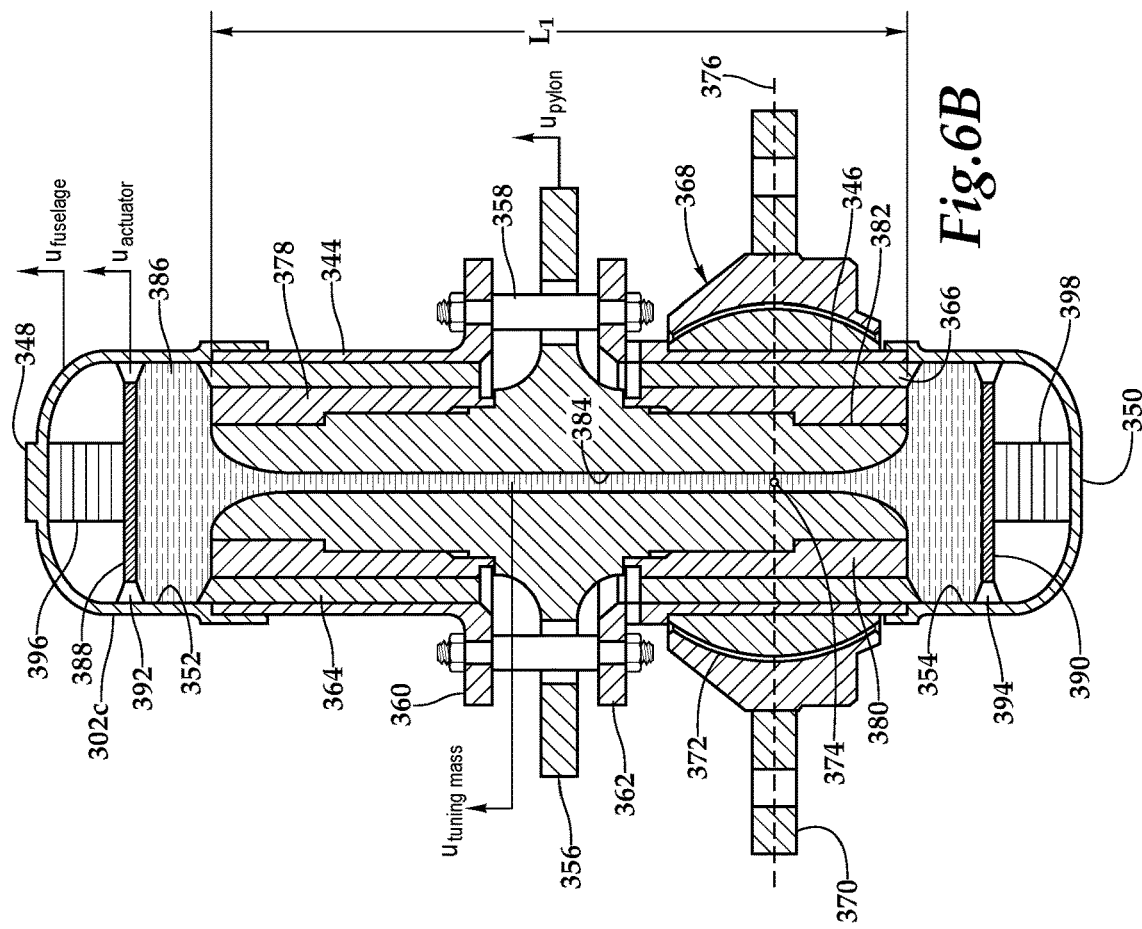
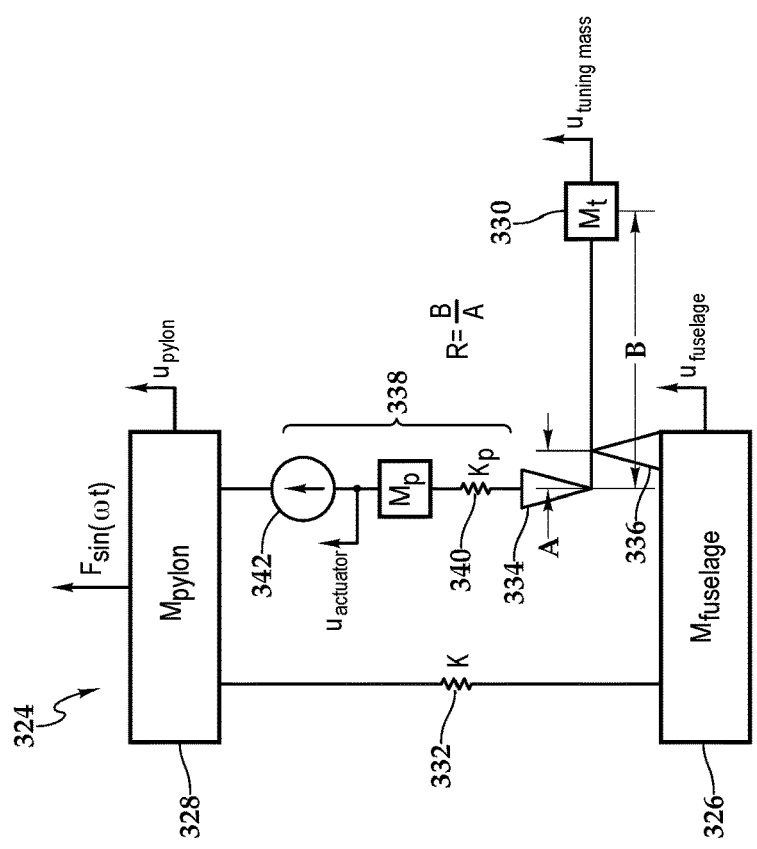
Fig.6B
Fig.6A

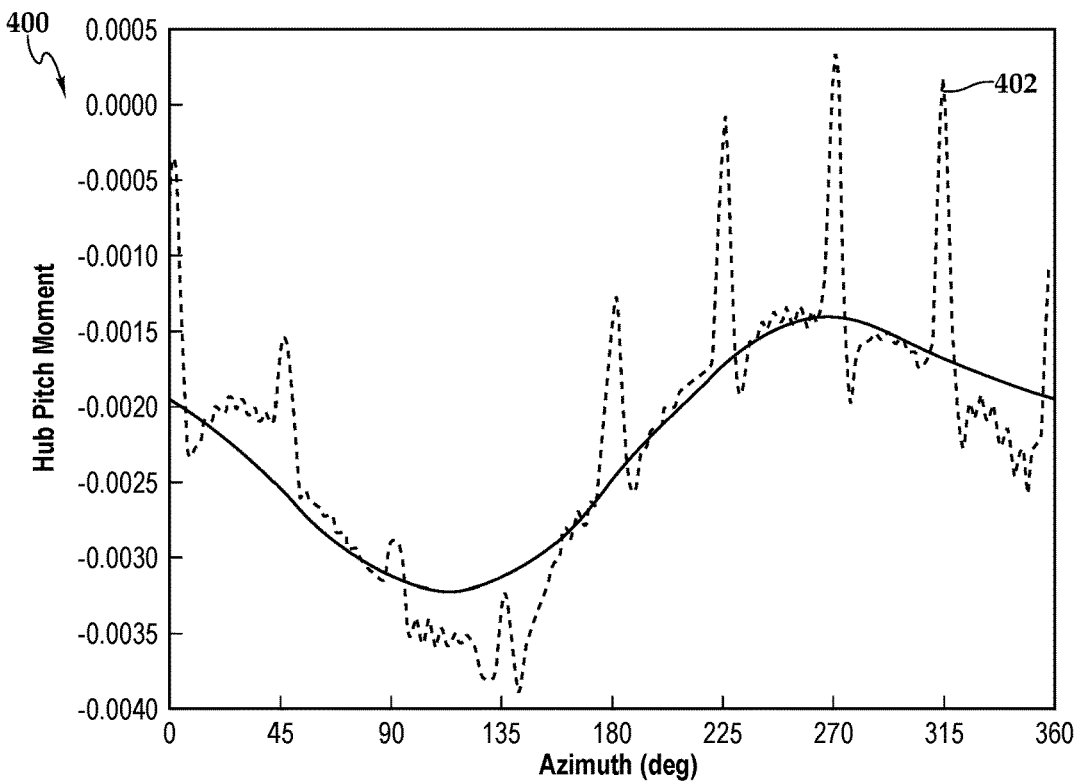
*Fig.7A*
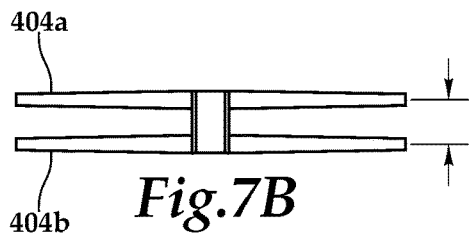  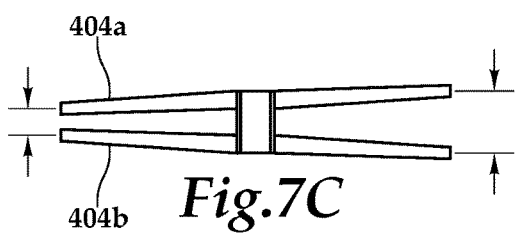
*Fig.7B*  *Fig.7C*
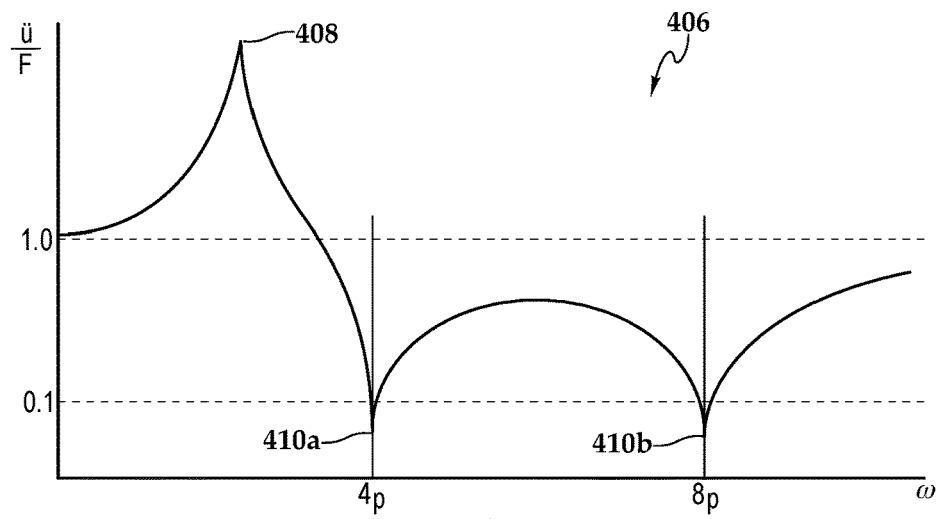
*Fig.7D*

VIBRATION ISOLATION SYSTEMS FOR COMPOUND HELICOPTERS

CROSS-REFERENCE TO RELATED APPLICATIONS

This is a divisional of application Ser. No. 17/154,925 filed Jan. 21, 2021, which is a continuation-in-part of application Ser. No. 16/716,264 filed Dec. 16, 2019, which is a continuation of application Ser. No. 15/459,781 filed Mar. 15, 2017, now abandoned, the entire contents of each is hereby incorporated by reference.

TECHNICAL FIELD OF THE DISCLOSURE

The present disclosure relates, in general, to vibration isolation systems and, in particular, to vibration isolation systems for compound helicopters including advancing blade concept rotorcraft to isolate mechanical vibrations in structures or bodies that are subject to harmonic or oscillating displacements or forces.

BACKGROUND

Conventional, single rotor helicopters have a limited top speed due to the problem of retreating blade stall, in which the rotor blade on the retreating side of the rotor disc in forward flight experiences loss of lift due to the rotorcraft's linear forward flight velocity exceeding the rotor blade's minimum angular velocity for lift production. Compound helicopters attempt to overcome the problem of retreating blade stall by utilizing one or more propellers such as a pusher propeller to augment the helicopter's forward speed. One type of compound helicopter is an advancing blade concept rotorcraft, in which one or more rotor blades advance on both sides of the rotorcraft during flight, thereby overcoming retreating blade stall and allowing for a faster forward airspeed. In one implementation, advancing blade concept rotorcraft include two counter rotating rotors that provide advancing blades on both sides of the rotorcraft during flight. It has been found, however, that compound helicopters are particularly susceptible to high amounts of vibration. For example, counter rotating rotors may combine harmonics in the wakes of one another, thereby creating excessive vibration in the fuselage of such rotorcraft. Fuselage vibration may be further exacerbated by the use of stiff high hinge offset rigid rotors, which may be present on some advancing blade concept rotorcraft. The excessive vibration associated with advancing blade concept rotorcraft contributes to crew fatigue, increased maintenance, increased operating costs and structural instability.

Current compound helicopters include main pylons that are hard mounted to the airframe of the helicopter. Attempts have been made to use active force generators to reduce fuselage vibration on compound helicopters that have hard mounted main pylons. It has been found, however, that active force generators when used in conjunction with hard mounted pylons add significant weight, have reliability and maintenance problems, generate high loads that contribute to structural fatigue, consume large amounts of power and have undesirable failure mode characteristics. Other parts of compound helicopters such as the wing may also be subject to high levels of vibration that, when left untreated, transmit throughout the helicopter. For example, counter rotating rotors may emit higher levels of rotor downwash than traditional rotors, which can cause excessive vibration of the wing of an advancing blade concept rotorcraft. Furthermore, the dual rotor systems of advancing blade concept rotorcraft have been found to emit dominant vibration characteristics at both the blade passage frequency and the 2×blade passage frequency. Current vibration control systems for advancing blade concept rotorcraft fail to effectively address the dominant harmonics unique to dual rotor systems. Accordingly, a need has arisen for vibration isolation systems that effectively prevent the transmission of vibration throughout compound helicopters including advancing blade concept rotorcraft.

SUMMARY

In a first aspect, the present disclosure is directed to a compound helicopter including a fuselage including a fuselage airframe, a translational thrust system coupled to the fuselage airframe and a pylon assembly subject to vibration. The pylon assembly includes a transmission and a rotor system having a main rotor assembly. The compound helicopter also includes a main rotor vibration isolation system including a plurality of augmented liquid inertia vibration eliminator units each having an isolation frequency and each coupled between the fuselage airframe and the pylon assembly to reduce transmission of the pylon assembly vibration to the fuselage airframe at the isolation frequency. Each augmented liquid inertia vibration eliminator unit includes at least one active tuning element movable to tune the isolation frequency thereof.

In some embodiments, the compound helicopter may include a tailboom extending from the fuselage and the translational thrust system may include a pusher propeller rotatably coupled to the aft portion of the tailboom. In certain embodiments, the main rotor assembly may include a dual rotor system having coaxially disposed top and bottom rotor assemblies that counter rotate relative to one another. In some embodiments, the rotor system may include rotor blades and the pylon assembly may include a pitch control assembly to adjust a pitch of the rotor blades. In such embodiments, the pitch control assembly may be operatively decoupled from the pylon assembly such that the pylon assembly vibration is independent of the pitch of the rotor blades. In certain embodiments, the main rotor vibration isolation system may include one or more supplementary vibration management devices such as a Frahm, an active hub shaker, an active force generator, a pendulum and/or a hub active vibration control system. In some embodiments, the main rotor vibration isolation system may include a four corner pylon mount structural assembly and the augmented liquid inertia vibration eliminator units may include four augmented liquid inertia vibration eliminator units each positioned at one of the four corners of the pylon mount structural assembly. In such embodiments, the main rotor vibration isolation system may include first and second pylon structures and the augmented liquid inertia vibration eliminator units may be coupled to the pylon assembly via the first and second pylon structures. Also in such embodiments, the augmented liquid inertia vibration eliminator units may include parallel and vertically-oriented augmented liquid inertia vibration eliminator units.

In some embodiments, the active tuning elements may be configured to change the isolation frequencies of the augmented liquid inertia vibration eliminator units based on a rotational speed of the main rotor assembly and the active tuning elements may each include a piezoelectric tuning element. In certain embodiments, the compound helicopter may include a wing subject to vibration including a wing airframe and a wing vibration isolation system. In such embodiments, the wing vibration isolation system may include one or more links coupled between the wing airframe and the fuselage airframe and each link may include a liquid inertia vibration eliminator unit configured to reduce transmission of the wing vibration to the fuselage airframe. In some embodiments, the wing vibration isolation system may include one or more supplementary vibration management devices such as a Frahm, an active hub shaker, an active force generator, a pendulum and/or a hub active vibration control system. In certain embodiments, the liquid inertia vibration eliminator unit(s) of the wing vibration isolation system may be passive or active liquid inertia vibration eliminator unit(s).

In some embodiments, the wing airframe may include one or more spars and the one or more links may be a plurality of links each including a liquid inertia vibration eliminator unit coupled between one of the spars and the fuselage airframe. In other embodiments, the one or more spars may include front and aft spars and the links may include front links coupled between the front spar and the fuselage airframe and aft links coupled between the aft spar and the fuselage airframe. In some embodiments, the links may include diagonally-oriented links between the front links and the aft links. In certain embodiments, the fuselage airframe may include left and right support beams. In such embodiments, the links may include left links coupled between the left support beam and the one or more spars and right links coupled between the right support beam and the one or more spars. Also in such embodiments, the links may include at least one diagonally-oriented lateral link between the left and right links. In certain embodiments, the links may include parallel and vertically-oriented links.

In a second aspect, the present disclosure is directed to an advancing blade concept rotorcraft having a fuselage including a fuselage airframe. The advancing blade concept rotorcraft also includes a pylon assembly including a dual rotor system having coaxially disposed top and bottom rotor assemblies that counter rotate relative to one another. The pylon assembly vibrates at a blade passage (bp) frequency and a 2×blade passage (2 bp) frequency. The advancing blade concept rotorcraft includes a dual rotor vibration isolation system including multi-frequency liquid inertia vibration eliminator units each having two or more isolation frequencies including the bp frequency and the 2 bp frequency. The multi-frequency liquid inertia vibration eliminator units are coupled between the fuselage airframe and the pylon assembly to reduce transmission of the pylon assembly vibration to the fuselage airframe at the bp frequency and the 2 bp frequency.

In some embodiments, the top and bottom rotor assemblies each may include four rotor blades. In such embodiments, the bp frequency may include a four-passage frequency and the 2 bp frequency may include an eight-passage frequency. In certain embodiments, each multi-frequency liquid inertia vibration eliminator unit may be a dual frequency liquid inertia vibration eliminator unit including a housing and a piston disposed within the housing, the piston being adapted for connection to one of the fuselage airframe or the pylon assembly. In such embodiments, each dual frequency liquid inertia vibration eliminator unit may also include a first fluid chamber and a second fluid chamber each defined by the housing and the piston, a first tuning port in continually unobstructed fluid communication with both the first fluid chamber and the second fluid chamber, a second tuning port in fluid communication with both the first fluid chamber and the second fluid chamber, the second tuning port in continuous parallel operation with the first tuning port and a tuning fluid disposed within the first fluid chamber, the second fluid chamber, the first tuning port and the second tuning port. In such embodiments, the first tuning port may allow isolation of vibration at the bp frequency, the isolation of vibration at the bp frequency resulting from displacement of the tuning fluid in the first tuning port, the displacement being a result of movement of the piston. Also in such embodiments, the second tuning port may allow isolation of vibration at the 2 bp frequency, the isolation of vibration at the 2 bp frequency being a result of displacement of the tuning fluid in the second tuning port, the displacement being a result of movement of the piston. In such embodiments, the movement of the piston may displace the tuning fluid in both the first tuning port and the second tuning port.

In some embodiments, each dual frequency liquid inertia vibration eliminator unit may include a spring-mass system associated with the second tuning port, the spring-mass system being configured to provide an additional degree of freedom. In certain embodiments, each multi-frequency liquid inertia vibration eliminator unit may include a multistage piezo-pumper portion including a piston and at least one piezoceramic actuator, the at least one piezoceramic actuator actively moving the piston to tune a vibration attenuation level of the multi-frequency liquid inertia vibration eliminator unit at the bp frequency and the 2 bp frequency. In some embodiments, the bp frequency may include a first range of frequencies including the bp frequency and the 2 bp frequency may include a second range of frequencies including the 2 bp frequency. In such embodiments, the at least one piezoceramic actuator may actively move the piston to tune the vibration attenuation level of the multi-frequency liquid inertia vibration eliminator unit across the first and second frequency ranges.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3B are isometric views of a vibration isolation system implemented on an advancing blade concept rotorcraft in accordance with embodiments of the present disclosure;

FIGS. 4A-4B are various views of a pylon link having a liquid inertia vibration eliminator unit in accordance with embodiments of the present disclosure;

FIGS. 5A-5D are various views of an active vibration isolation system implemented on an advancing blade concept rotorcraft in accordance with embodiments of the present disclosure;

FIGS. 6A-6B are various views of an active liquid inertia vibration eliminator unit in accordance with embodiments of the present disclosure;

FIGS. 7A-7D are various schematic illustrations and graphs showing the vibration characteristics of advancing blade concept rotorcraft;

DETAILED DESCRIPTION

Figure 1A:
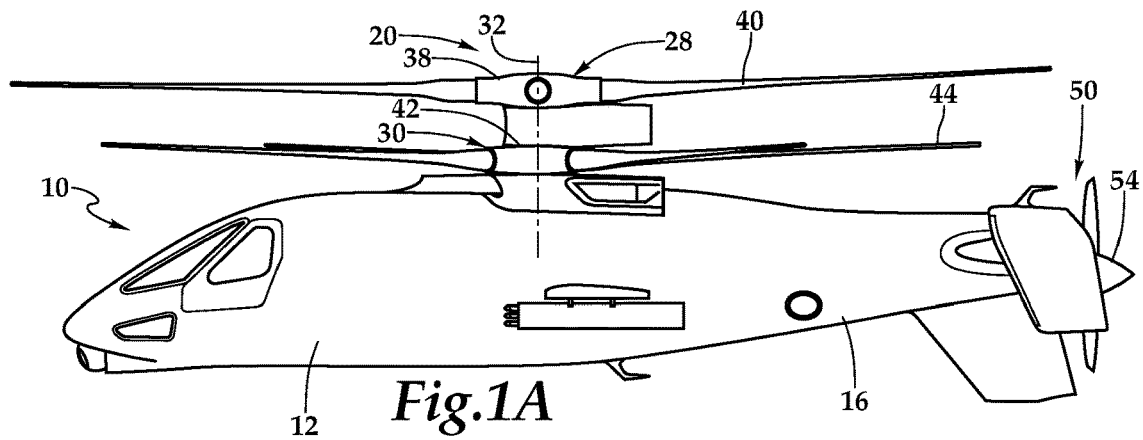
FIGS. 1A-1D are schematic illustrations of an advancing blade concept rotorcraft utilizing a vibration isolation system in accordance with embodiments of the present disclosure.
Figure 1B:
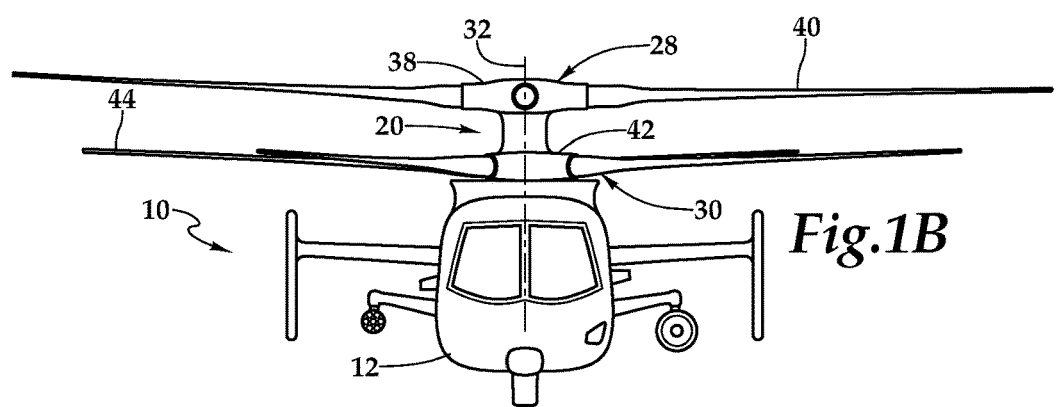
Figure 1C:
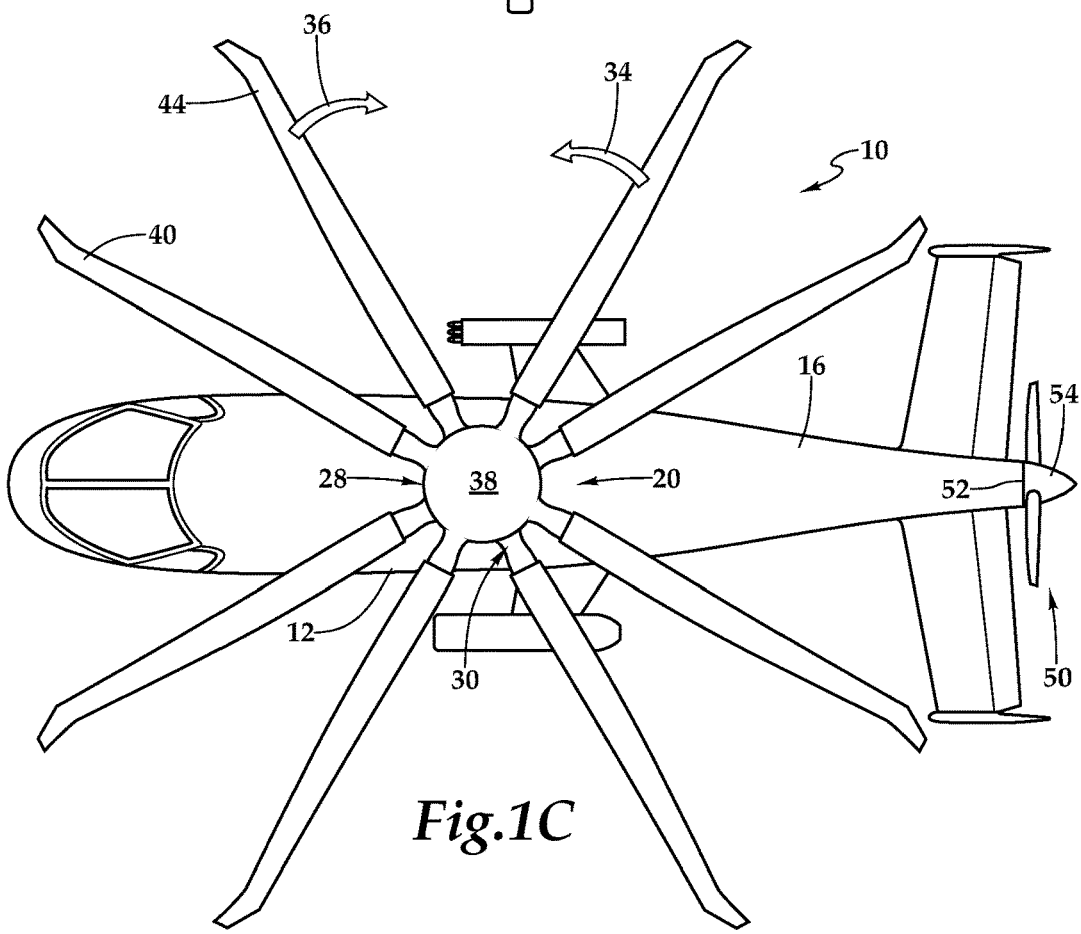
Figure 1D:
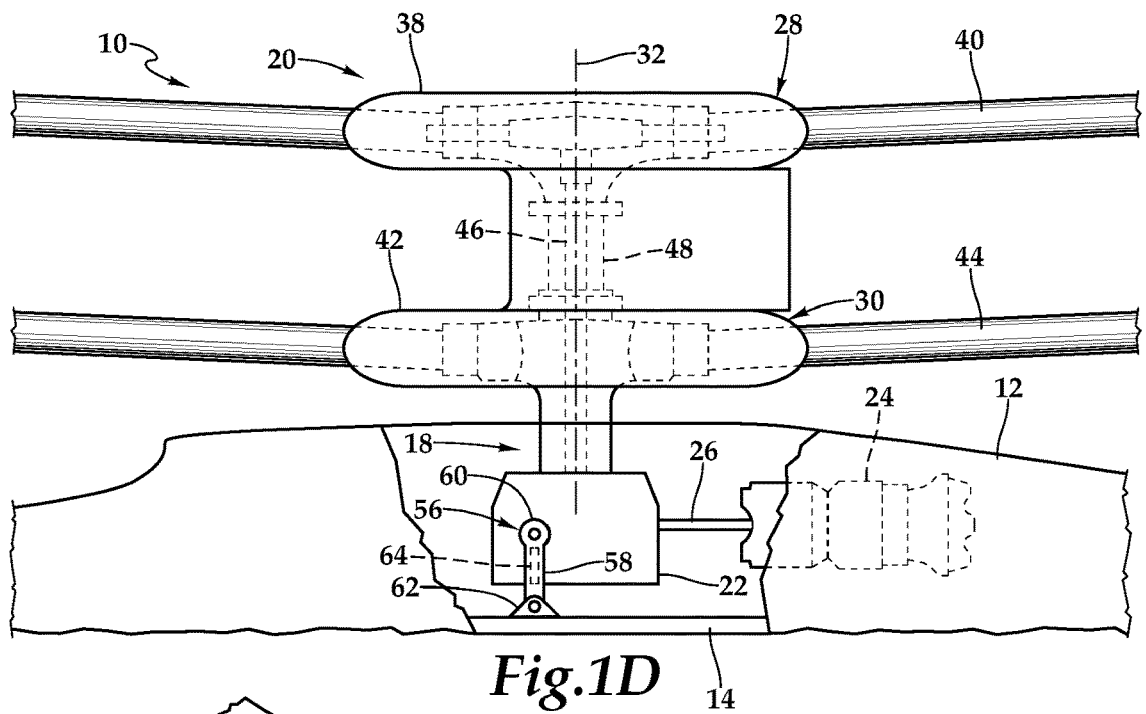

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A-1D in the drawings, an advancing blade concept rotorcraft capable of vertical takeoff and landing (VTOL) is schematically illustrated and generally designated 10. Advancing blade concept rotorcraft 10 includes a fuselage 12 supported by an airframe 14. A tailboom 16 extends aft of fuselage 12. Pylon assembly 18 includes a dual rotor system 20 and a transmission 22, or gearbox, which is powered by one or more engines 24 via a drive shaft 26. Dual rotor system 20 includes top and bottom rotor assemblies 28, 30 that counter rotate relative to one another about rotor axis 32. Top rotor assembly 28 is rotatable in a first direction 34 about rotor axis 32. Bottom rotor assembly 30 is rotatable in a second direction 36 about rotor axis 32, opposite to first direction 34. While first direction 34 is illustrated as counter-clockwise and second direction 36 is illustrated as clockwise in FIG. 1C, it will be appreciated that in some embodiments the directions of rotation of top rotor assembly 28 and bottom rotor assembly 30 may be reversed.

Top rotor assembly 28 includes top rotor hub assembly 38 from which a plurality of rotor blade assemblies 40 radially project outward. Similarly, bottom rotor assembly 30 includes bottom rotor hub assembly 42 from which a plurality of rotor blade assemblies 44 radially project outward. Top and bottom rotor assemblies 28, 30 may each include any number of rotor blade assemblies 40, 44. In the illustrated embodiment, each rotor assembly 28, 30 includes four rotor blade assemblies. Top and bottom rotor assemblies 28 and 30 are also coaxial. In particular, top rotor hub assembly 38 is mounted to an upper rotor shaft 46. Upper rotor shaft 46 counter rotates within a lower rotor shaft 48, to which bottom rotor hub assembly 42 is mounted. Top and bottom rotor assemblies 28, 30 may be rigid, hingeless and/or stiff in plane. Rotor blade assemblies 40, 44 may be capable of collective and/or cyclic pitching. It should be understood that various blade attachments may be utilized by advancing blade concept rotorcraft 10. Top and bottom rotor assemblies 28, 30 may be static or variable speed. In some embodiments, top and bottom rotor assemblies 28, 30 may be capable of tilting together in the same direction or may tilt at different angles relative to one another.

Advancing blade concept rotorcraft 10 is a compound helicopter that includes translational thrust system 50 located at aft end 52 of tailboom 16. Translational thrust system 50 includes a pusher propeller 54 that propels advancing blade concept rotorcraft 10 in a forward direction. Assisted by pusher propeller 54, advancing blade concept rotorcraft 10 may be capable of high forward airspeed. By providing propulsion for advancing blade concept rotorcraft 10, pusher propeller 54 may reduce the drag burden on dual rotor system 20. Pusher propeller 54 may be a variable pitch pusher propeller and may be clutchable. Pusher propeller 54 may be powered by engine 24 via a gearbox, such as transmission 22. While shown in the context of a pusher propeller configuration, it will be understood by one of ordinary skill that pusher propeller 54 may also be a more conventional puller propeller or could be variably facing so as to provide yaw control in addition to or instead of translational thrust.

Because pylon assembly 18 is subject to vibration, advancing blade concept rotorcraft 10 includes a vibration isolation system 56. Transmission 22 of pylon assembly 18 is mounted to airframe 14 by one or more pylon links 58. In particular, first end 60 of pylon link 58 is coupled to transmission 22 and second end 62 of pylon link 58 is coupled to airframe 14. As used herein, the term "coupled" may include direct or indirect coupling by any means, including moving and/or non-moving mechanical connections. Pylon link 58 includes a vibration isolator 64 such that vibration isolator 64 is interposed between pylon assembly 18 and airframe 14. Vibration isolator 64 intercepts vibrations between pylon assembly 18 and airframe 14 so as to reduce or prevent the transmission of pylon assembly vibration to airframe 14, thus preventing undesirable shaking, vibration or instability of fuselage 12.

Advancing blade concept rotorcraft 10 may utilize some or all aspects of X2 Technology™ by Sikorsky®, which may have a fly-by-wire architecture and include coaxial and counter rotating dual rotor system 20. It should be appreciated that advancing blade concept rotorcraft 10 is merely illustrative of a variety of aircraft that can implement the embodiments disclosed herein. Indeed, vibration isolation system 56 may be utilized on any aircraft that experiences vibration. Other aircraft implementations can include single rotor helicopters, single rotor compound helicopters, hybrid aircraft, tiltrotor aircraft, tiltwing aircraft, quad tiltrotor aircraft, unmanned aircraft, gyrocopters, airplanes, jets and the like. As such, those skilled in the art will recognize that vibration isolation system 56 can be integrated into a variety of aircraft configurations. In addition, vibration isolation system 56 is not limited to controlling vibration between only pylon assembly 18 and airframe 14 and may be interposed between any two or more aircraft components to limit the transmission of vibration therebetween. For example, vibration isolation system 56 may be interposed between the wing airframe and fuselage airframe of a rotorcraft. It should be appreciated that even though aircraft are particularly well-suited to implement the embodiments of the present disclosure, non-aircraft vehicles and devices can also implement the embodiments.

Figure 2:
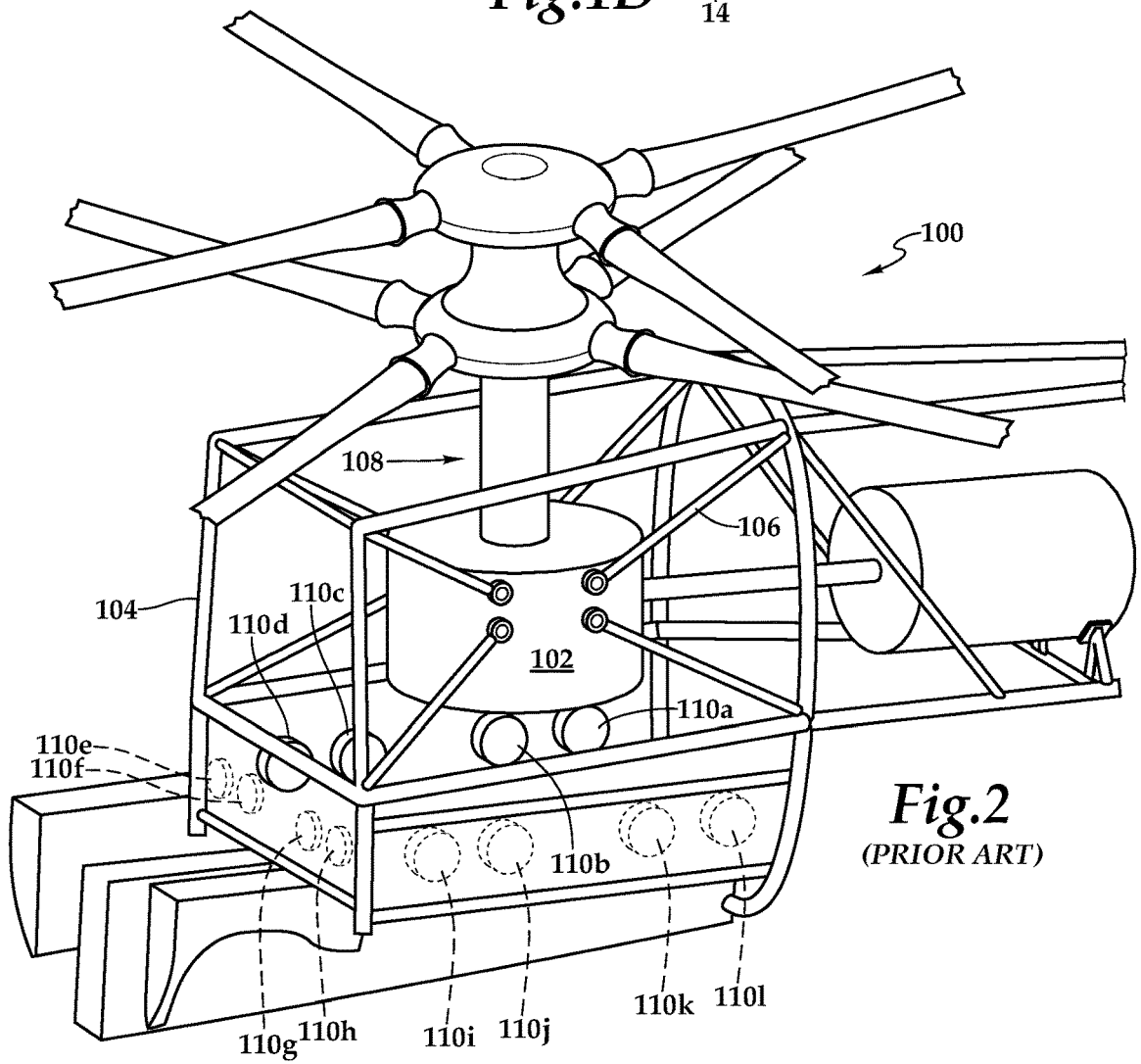
FIG. 2 is an isometric view of an advancing blade concept rotorcraft utilizing active force generators to reduce vibration.
Figure 5A:
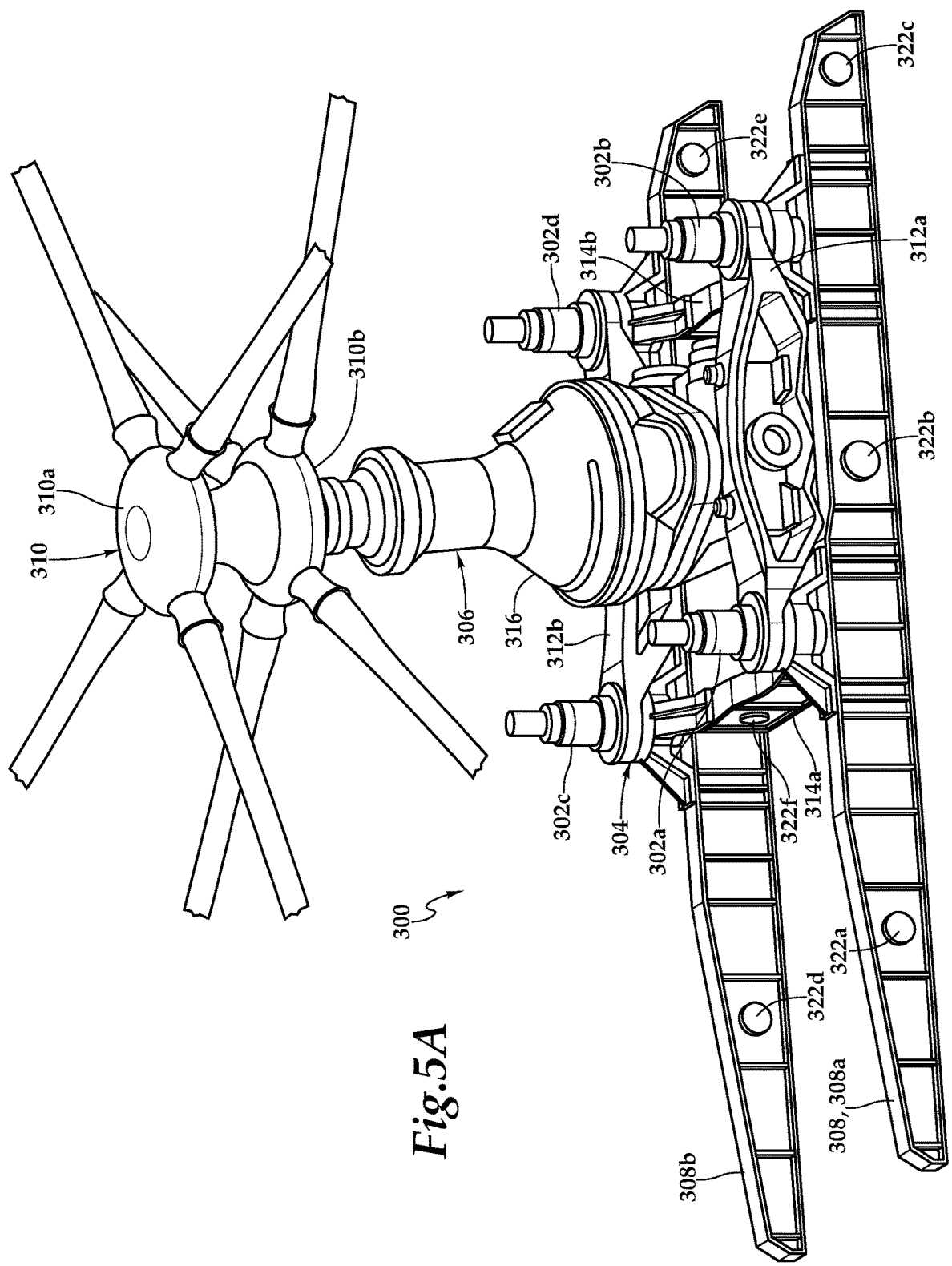
Figure 5B:
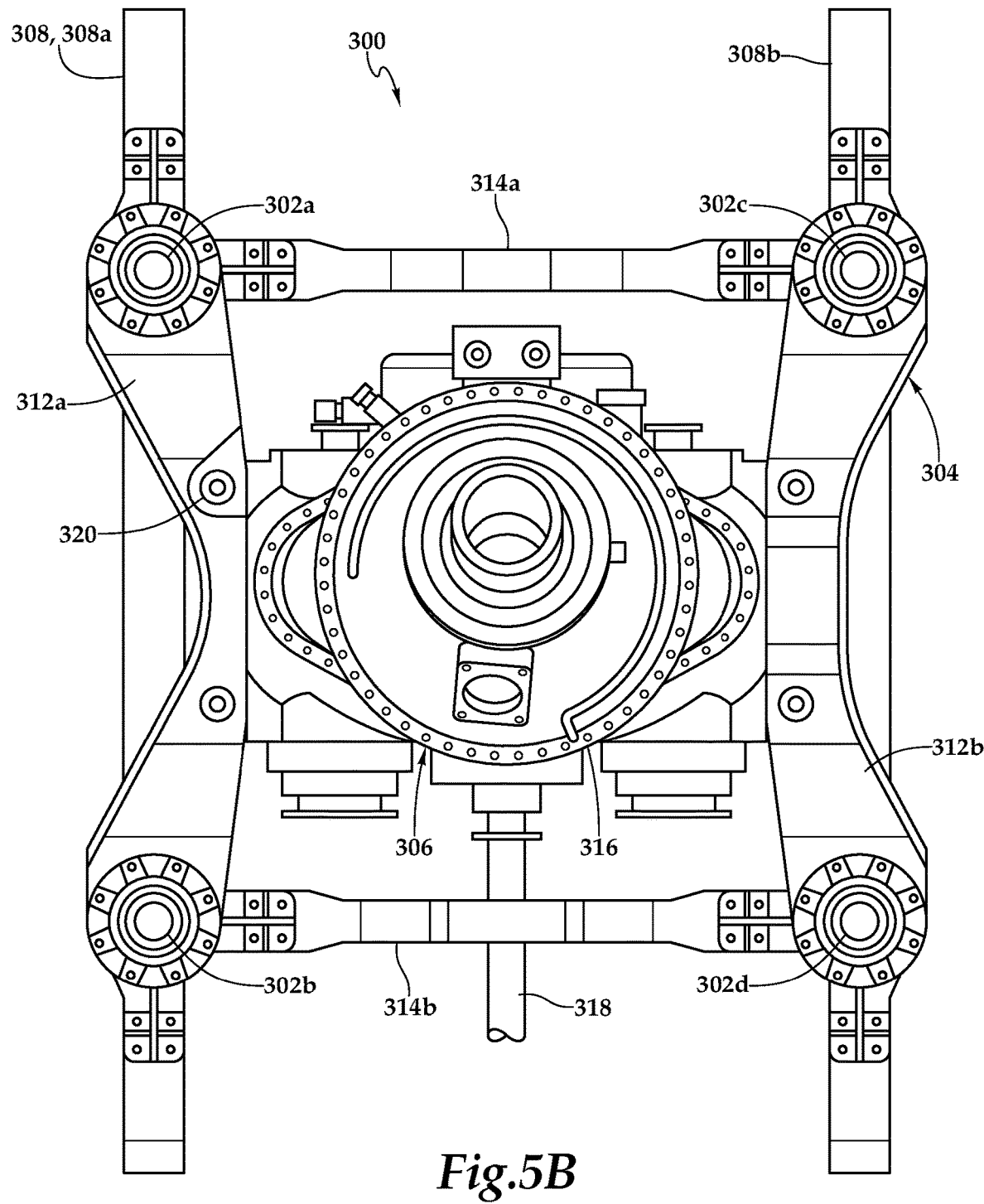

Referring to FIG. 2 in the drawings, an active force generation system on an advancing blade concept rotorcraft is schematically illustrated and generally designated 100. Transmission 102 is rigidly bolted onto airframe 104. Rigid struts 106 are used to bolt transmission 102 to airframe 104. Because transmission 102 is rigidly attached to airframe 104, the vibration of pylon assembly 108 is freely transmitted to airframe 104. Previous advancing blade concept rotorcraft, such as rotorcraft utilizing X2 Technology™, have attempted to reduce rotorcraft vibration caused by pylon assembly 108 solely using active force generators, such as active force generators 110a-110l. Active force generators 110a-110l produce a force that is out of phase with the vibration of pylon assembly 108, thereby lowering the vibration in the remainder of the advancing blade concept rotorcraft, including airframe 104 and the fuselage.

Attempts to control vibration on advancing blade concept rotorcraft with hard mounted pylons using active force generators, such as those in active force generation system 100, have led to a number of problems. Because active force generators 110a-110l emit amplitudes that are opposite those of pylon assembly 108, the force amplitudes experienced by the advancing blade concept rotorcraft may be doubled, thereby increasing the fatigue on airframe 104 and other structures of the advancing blade concept rotorcraft. Active force generators 110a-110l contribute a significant weight penalty to the advancing blade concept rotorcraft due to the presence of an active damping mass as well as support structure, power generation components and controlling devices necessary for the operation of active force generators 110a-110l. The airframe substantiation required to structurally mount active force generators 110a-110l within the fuselage also contributes to the overall weight of active force generation system 100. Because active force generators 110a-110l are active electronically-controlled devices, they require an electronic feedback loop that may produce a delayed response when maneuvering through transient flight envelopes. Active force generators 110a-110l are also complex, expensive and have undesirable failure mode characteristics. For example, active force generation system 100 would cease to function if power to active force generators 110a-110l were compromised. These and other drawbacks of using active force generation system 100 on hard mounted pylon assembly 108 have brought about a need for an improved system for controlling the vibration in an advancing blade concept rotorcraft.

Referring to FIGS. 3A-3B in the drawings, a portion of an advancing blade concept rotorcraft is schematically illustrated and generally designated 200. Advancing blade concept rotorcraft 200 has pylon assembly 202, which includes dual rotor system 204 and transmission 206. Advancing blade concept rotorcraft 200 includes vibration isolation system 208 to control the vibration of pylon assembly 202. Vibration isolation system 208 includes pylon links 210, 212. Ends 214, 216 of pylon links 210, 212 are pinned, bolted or otherwise coupled to transmission 206, respectively. Ends 218, 220 of pylon links 210, 212 are pinned, bolted or otherwise coupled to airframe 222, respectively. Ends 218, 220 of pylon links 210, 212 may be coupled to airframe 222 via pylon support fittings 224, 226, respectively. Pylon links 210, 212 each include vibration isolators 228, 230, respectively. Vibration isolators 228, 230 are interposed between pylon assembly 202 and airframe 222 to intercept the vibration of pylon assembly 202 before it reaches airframe 222. Vibration isolators 228, 230 attenuate, isolate or otherwise reduce transfer of mechanical or harmonic vibration, such as periodic vibration, between pylon assembly 202 and airframe 222. Thus, vibration isolators 228, 230 reduce or prevent the transmission of pylon assembly vibration to airframe 222, the fuselage and other parts of advancing blade concept rotorcraft 200. Reducing such vibration improves avionics, passenger comfort and electronic and structural component longevity. Non-limiting examples of rotorcraft vibrations of concern include a blade pass frequency and higher harmonics, among others. While vibration isolation system 208 is illustrated to include two pylon links 210, 212 that are each oriented vertically, vibration isolation system 208 may include any number of pylon links, each including a respective vibration isolator, and the pylon links may be configured in any combination of directions to reduce or prevent the vibration of pylon assembly 202 along multiple degrees of freedom.

In some embodiments, vibration isolators 228, 230 may be passive vibration isolators, and therefore not require a power source to be operational. Referring to FIGS. 4A-4B in conjunction with FIGS. 3A-3B, in some embodiments pylon link 210 may include a liquid inertia vibration eliminator (LIVE™) unit 232. Pylon link 210 is substantially similar to pylon link 212 therefore, for sake of efficiency, certain features will be disclosed only with regard to pylon link 210. One having ordinary skill in the art, however, will fully appreciate an understanding of pylon link 212 and any additional pylon links based upon the disclosure herein of pylon link 210. LIVE™ unit 232 is a vibration-canceling throughput unit and can take many forms. As best seen in FIG. 4B, which is a cross-sectional view of FIG. 4A taken along line 4B-4B, LIVE™ unit 232 includes a housing 234 that has a hollow, generally cylindrical interior. A piston 236 of a selected cross-sectional diameter is disposed within the interior of housing 234. Elastomeric seal and spring members 238a, 238b resiliently seal piston 236 within the interior of housing 234. A first fluid chamber 240 and a second fluid chamber 242 are defined by the interior of housing 234 and piston 236 and are sealed against leakage by elastomeric seal and spring members 238a, 238b. Tuning fluid, which may be a high density and low viscosity fluid, is disposed within fluid chambers 240, 242. In addition to sealing the tuning fluid and fluid chambers 240, 242, elastomeric seal and spring members 238a, 238b function as a spring to permit piston 236 to move or oscillate in a longitudinal direction indicated by double arrow 244, relative to housing 234, while maintaining piston 236 in a central location in housing 234 when no load is applied. A tuning passage 246 extends centrally through piston 236 and permits the tuning fluid to flow between first fluid chamber 240 and second fluid chamber 242.

A top portion 248 of pylon link 210 may be attached to piston 236 via bracket 250, and a bottom portion 252 of pylon link 210 may be attached to housing 234. In other embodiments, top portion 248 of pylon link 210 may be attached to housing 234, and bottom portion 252 of pylon link 210 may be attached to piston 236. In operation, vibration of pylon assembly 202 at a particular frequency displaces piston 236 relative to housing 234 along double arrow 244. Because the force and displacement are oscillatory over time, piston 236 similarly oscillates relative to housing 234. A displacement of piston 236 causes a displacement of tuning fluid through tuning passage 246 in the opposite direction of the displacement of piston 236. The displacement of piston 236 causes an oscillatory reaction force due to strain and elastomeric seal and spring members 238a, 238b. At the same time, the volumes of tuning fluid in first and second fluid chambers 240, 242 are alternately increased and decreased such that the tuning fluid is pumped back and forth through tuning passage 246. The inertial force created by acceleration of the mass of the tuning fluid is out of phase with the pylon assembly vibration introduced to piston 236 via bracket 250. At an isolation frequency, the force of the mass of the tuning fluid cancels the force introduced to piston 236 via bracket 250, thereby isolating the vibration of pylon assembly 202.

LIVE™ unit 232 is a passive vibration isolator. Passive LIVE™ units are effective at or near a single vibration frequency. In contrast, an active vibration isolation system can be effective over a range of frequencies to accommodate more than just a single isolation frequency, such as when a rotorcraft operates at different rotor speeds or when attempting to reduce the transmission of pylon assembly vibration occurring at multiple frequencies. Active vibration isolation systems are particularly useful for coaxial rotor systems to isolate the plurality of vibration frequencies emitted from such systems. In some embodiments, LIVE™ unit 232 may be an active LIVE™ unit, such as by introducing a pump or other technique for actively oscillating or moving the tuning fluid through tuning passage 246. The dynamic response characteristics of an active LIVE™ unit can be altered as desired. An active LIVE™ unit may include active adjustment of the isolation frequency and the frequency response characteristics of the LIVE™ unit. For example, a pressure differential in a LIVE™ unit can be actively adjusted to affect the isolation frequency and frequency response characteristics of the LIVE™ unit. In some embodiments, active pumper devices may use piezoelectric or electromagnetic actuation within the LIVE™ unit to oscillate tuning fluid through tuning passage 246 by mechanically activating piston 236 or housing 234. In addition, an electromagnetic pump device, which uses an electric motor to oscillate piston 236 and dynamically displace the tuning fluid, may be used to generate a sinusoidal displacement of tuning fluid. The electric motor speed and sinusoidal displacement amplitude may be controlled to produce the desired quantity of pumped fluid and the frequency of fluid oscillations. Oscillating pumps external to the LIVE™ unit may also be used to introduce oscillating fluid flow to tuning passage 246 of piston 236.

In contrast to the active force generation system described in FIG. 2, vibration isolation system 208 of the illustrative embodiments is lighter, more robust and less prone to failure during flight. Because vibration isolation system 208 is passive and does not need external power, loss of power to vibration isolation system 208 does not affect the vibration isolation capabilities of vibration isolation system 208. Vibration isolation system 208 requires less airframe substantiation and puts less strain on surrounding structure than the active force generation system described in FIG. 2. Because vibration isolation system 208 requires less support equipment, such as an external power supply and controlling devices, vibration isolation system 208 may also be less costly. Because no electronic feedback loop is required to operate vibration isolation system 208, no delayed response occurs when maneuvering through transient flight envelopes.

Referring to FIGS. 5A-5D in the drawings, a main rotor vibration isolation system for an advancing blade concept rotorcraft is schematically illustrated and generally designated 300. Main rotor vibration isolation system 300 includes a LIVE™ unit 302a, 302b, 302c, 302d located in each corner of a four corner pylon mount structural assembly 304 that supports pylon assembly 306 atop fuselage airframe 308 including roof beams 308a, 308b. Pylon assembly 306 includes dual rotor system 310 having counter rotating top and bottom rotor assemblies 310a, 310b. In the illustrated embodiments, each rotor assembly 310a, 310b includes four rotor blades, although rotor assemblies 310a, 310b may each have any number of rotor blades such as less than four or more than four rotor blades.

LIVE™ units 302a, 302b, 302c, 302d are generally parallel and vertically-oriented such that each LIVE™ unit 302a, 302b, 302c, 302d is approximately orthogonal to the forward direction of travel of the advancing blade concept rotorcraft. The combination of four LIVE™ units 302a, 302b, 302c, 302d, two being forward of pylon assembly 306 and two being aft of pylon assembly 306, collectively are effective at isolating vertical shear, pitch moment as well as roll moment induced vibrations of dual rotor system 310. For example, rotor hub induced pitch moment vibrations, which can become relatively large in high speed forward flight, may be effectively isolated with four LIVE™ units 302a, 302b, 302c, 302d, each located at a respective corner of pylon mount structural assembly 304. LIVE™ units 302a, 302b, 302c, 302d are widely spaced and isolate vibration from pylon assembly 306 before the vibration enters fuselage airframe 308. While main rotor vibration isolation system 300 includes four LIVE™ units 302a, 302b, 302c, 302d, it will be appreciated that main rotor vibration isolation system 300 may include any number of LIVE™ units such as two, three, five or more LIVE™ units. For example, pylon mount structural assembly 304 may be a three corner pylon mount structural assembly having a triangle configuration that supports three LIVE™ units.

Pylon mount structural assembly 304 includes a first pylon structure 312a, a second pylon structure 312b, left roof beam 308a, right roof beam 308b, a forward cross member 314a and an aft cross member 314b. Structural adapters may be used to structurally couple roof beams 308a, 308b with cross members 314a, 314b. Roof beams 308a, 308b may be coupled to or integral with fuselage airframe 308 while pylon structures 312a, 312b are coupled to LIVE™ units 302a, 302b, 302c, 302d. First pylon structure 312a is mounted with LIVE™ units 302a, 302b while second pylon structure 312b is mounted with LIVE™ units 302c, 302d. Transmission 316 of pylon assembly 306 is coupled to pylon structures 312a, 312b as opposed to being directly coupled to LIVE™ units 302a, 302b, 302c, 302d. One or more driveshafts carry mechanical power from one or more engines to transmission 316. It should be appreciated that any number of engines and/or transmissions may be employed and that any number of pylon structures may be used in a variety of orientations or configurations spaced fore, aft and/or outboard of transmission 316. A driveshaft 318 may be used to transmit rotational energy to a tail rotor and/or translational thrust system.

In the illustrated embodiment, LIVE™ units 302a, 302b, 302c, 302d are spaced away from transmission 316. For example, LIVE™ units 302a, 302b, 302c, 302d are mounted forward and aft of transmission 316. Additionally, LIVE™ units 302a, 302b, 302c, 302d are mounted outboard from transmission 316. For example, LIVE™ units 302a, 302b, 302c, 302d are mounted sufficiently outboard so as to be located further outboard than points of coupling 320 between transmission 316 and pylon structures 312a, 312b. Points of coupling 320 are inboard between roof beams 308a, 308b. In so doing, LIVE™ units 302a, 302c are positioned above roof beams 308a, 308b forward of transmission 316 and LIVE™ units 302b, 302d are positioned above roof beams 308a, 308b aft of transmission 316. LIVE™ units 302a, 302b, 302c, 302d are spaced away from points of coupling 320 between pylon structures 312a, 312b and transmission 316 in the fore, aft and outboard directions. However, it is understood that other embodiments may adjust the spacing to affect or react to dynamics from different aircraft or transmissions.

Pylon structures 312a, 312b are configured to correlate motion of transmission 316 between LIVE™ units 302a, 302b, 302c, 302d simultaneously by suspending a portion of transmission 316 between LIVE™ units 302a, 302b, 302c, 302d located on opposing ends of pylon structures 312a, 312b. The use of pylon structures 312a, 312b permits the location of LIVE™ units 302a, 302b, 302c, 302d to be spaced in an infinite number of locations independent of transmission 316. Locating LIVE™ units 302a, 302b, 302c, 302d forward and aft of transmission 316 enables pylon mount structural assembly 304 to minimize the size of each LIVE™ unit 302a, 302b, 302c, 302d and does not require the use of additional elements to control the dynamics of transmission 316. For example, pylon mount structural assembly 304 is springless in that the assembly does not require the use of a spring mounted externally beneath transmission 316 to control the dynamics of transmission 316. Pylon mount structural assembly 304 is configured to control pitch and roll dynamics by the spacing of LIVE™ units 302a, 302b, 302c, 302d and the use of pylon structures 312a, 312b.

In some embodiments, main rotor vibration isolation system 300 may include one or more supplementary vibration management devices 322a, 322b, 322c, 322d, 322e, 322f to provide supplementary vibration control of pylon assembly 306 in addition to LIVE™ units 302a, 302b, 302c, 302d. Supplementary vibration management devices 322a, 322b, 322c, 322d, 322e, 322f may be or include any combination of Frahms, passive spring mass absorbers, active spring mass absorbers, active hub shakers, active force generators, pendulums and/or hub active vibration control systems. In embodiments in which supplementary vibration management devices 322a, 322b, 322c, 322d, 322e, 322f are Frahms, the Frahms may be modified with active piezoceramic tuning elements. In some embodiments, the Frahms may be passive spring mass absorbers. In embodiments in which supplementary vibration management devices 322a, 322b, 322c, 322d, 322e, 322f are active force generators, supplementary vibration management devices 322a, 322b, 322c, 322d, 322e, 322f may produce forces in different directions to cancel the multidirectional oscillations of pylon assembly 306. For example, supplementary vibration management device 322b may produce vertical forces, supplementary vibration management devices 322a, 322c, 322d, 322e may produce forces in the longitudinal direction and supplementary vibration management device 322f may produce forces in the lateral direction. Among the types of active force generators that may be used to control vibration are active force generators manufactured by Moog® Inc. Main rotor vibration isolation system 300 may include any number of supplementary vibration management devices disposed at any location relative to pylon assembly 306 including anywhere on fuselage airframe 308, pylon mount structural assembly 304 and/or pylon assembly 306 itself.

In the illustrated embodiment, LIVE™ units 302a, 302b, 302c, 302d are active augmented, or tunable, LIVE™ units for which the isolation frequency(ies) may be actively tuned to most efficiently isolate the vibrations emanating from pylon assembly 306 including dual rotor system 310. Referring to FIGS. 6A-6B in conjunction with FIGS. 5A-5D in the drawings, additional details regarding the structure and operation of LIVE™ units 302a, 302b, 302c, 302d are schematically illustrated. In FIG. 6A, an exemplary mechanical equivalent model 324 for each LIVE™ unit 302a, 302b, 302c, 302d of main rotor vibration isolation system 300 according to the illustrative embodiments is illustrated. It will be appreciated by one of ordinary skill in the art that although LIVE™ units 302a, 302b, 302c, 302d of the illustrative embodiments are described herein with respect to an aircraft application, LIVE™ units 302a, 302b, 302c, 302d may be used in any application in which it is desirable to isolate the vibration between one body and another. The following discussion of mechanical equivalent model 324 will be with respect to an application of an active augmented LIVE™ unit on an advancing blade concept rotorcraft to isolate the vibratory forces generated in pylon assembly 306 from the fuselage including fuselage airframe 308. In mechanical equivalent model 324, the fuselage of the rotorcraft is represented as the mass of the fuselage $M_{fuselage}$, or box 326, pylon assembly 306 is represented as the mass of the pylon $M_{pylon}$, or box 328, and a box 330 represents the mass of the tuning mass $M_t$, which in the illustrative embodiments may be either a rod such as a tungsten rod disposed in a tuning passage or tuning fluid disposed in a tuning passage. A vibratory force $F \cdot \sin(\omega t)$ is generated by pylon assembly 306. Force $F \cdot \sin(\omega t)$ is a function of the frequency of vibration of pylon assembly 306 caused by dual rotor system 310 and transmission 316.

Force F·sin(ωt) causes an oscillatory displacement $u_{pylon}$ of the pylon $M_{pylon}$, an oscillatory displacement $u_{fuselage}$ of the fuselage $M_{fuselage}$ and an oscillatory displacement $u_{tuning\ mass}$ of the tuning mass $M_t$. A spring member represented by a spring 332 is disposed between the fuselage $M_{fuselage}$ and the pylon $M_{pylon}$. Spring 332 has a spring constant K. Tuning mass $M_t$ is operably associated with fuselage $M_{fuselage}$ and pylon $M_{pylon}$. In mechanical equivalent model 324, tuning mass $M_t$ functions as if cantilevered from a first fulcrum 334 attached to pylon $M_{pylon}$ and a second fulcrum 336 attached to the fuselage $M_{fuselage}$. The distance A from first fulcrum 334 to second fulcrum 336 represents the cross-sectional area of the tuning rod or passage and the distance B from first fulcrum 334 to the tuning mass $M_t$ represents the effective cross-sectional area of a piston such that an area ratio, or hydraulic ratio, R is equal to the ratio of B to A.

An active tuning element 338 is disposed between the pylon $M_{pylon}$ and the tuning mass $M_t$. Active tuning element 338 functions to make fulcrum 334 vibrate. Active tuning element 338 may in some embodiments represent a plurality of active tuning elements acting either together or independently. In some embodiments, active tuning element 338 is a piezoceramic element that oscillates in one or more frequency ranges that counteract the vibration of the pylon $M_{pylon}$. In other embodiments, active tuning element 338 may be comprised of other smart materials such as electrostrictive materials and/or magnetostrictive materials or may comprise other elements such as electromagnetic, pneumatic, hydraulic or other elements.

Active tuning element 338 may be represented by mechanical properties including a spring element 340 having a spring constant $K_p$, a mass $M_p$ and a controllable force element 342. Controllable force element 342 may have any phase angle and be of any magnitude within the maximum capabilities of active tuning element 338. Active tuning element 338 also includes control circuitry (not shown) for controlling the actuation of active tuning element 338. Active tuning element 338 allows for selective actuation of the tuning mass $M_t$.

As best seen in FIG. 6B, LIVE™ unit 302c, which is generally representative of LIVE™ units 302a, 302b, 302d, includes an upper housing 344 and a lower housing 346. An upper reservoir housing 348 and a lower reservoir housing 350 are coupled to end portions of upper housing 344 and lower housing 346, respectively. Upper reservoir housing 348 and lower reservoir housing 350 at least partially define an upper fluid chamber 352 and a lower fluid chamber 354, respectively. A piston spindle 356 includes a cylindrical portion that is at least partially disposed within the interior of upper housing 344 and lower housing 346. A plurality of studs 358 rigidly couple together upper housing 344 and lower housing 346 via an upper ring 360 and a lower ring 362, respectively, so that upper housing 344 and lower housing 346 function as a single rigid body. Studs 358 extend through piston spindle 356 within apertures sized to prevent any contact between studs 358 and piston spindle 356 during operation. Piston spindle 356 is resiliently coupled to upper housing 344 and lower housing 346 via an upper elastomer member 364 and a lower elastomer member 366, respectively. Upper elastomer member 364 and lower elastomer member 366 each function similar to a journal bearing.

Piston spindle 356 is coupled to a vibrating body such as pylon assembly 306 via pylon structures 312a, 312b. A spherical bearing assembly 368 is coupled to lower housing 346. Spherical bearing assembly 368 includes an attachment member 370 configured for coupling spherical bearing assembly 368 to a body to be isolated from vibration such as fuselage airframe 308 including roof beams 308a, 308b. In such an arrangement, fuselage airframe 308 serves as the body to be isolated from vibration and pylon assembly 306 including dual rotor system 310 and transmission 316 of the rotorcraft serves as the vibrating body. Spherical bearing assembly 368 includes a spherical elastomeric member 372 having an elastomeric material bonded between a non-resilient concave member and a non-resilient convex member. Spherical elastomeric member 372 is configured to compensate for misalignment in loading between pylon assembly 306 and roof beams 308a, 308b through shearing deformation of the elastomeric material. Spherical elastomeric member 372 is partially spherical shaped with a rotational center point 374 that lies on a centerline plane 376 of attachment member 370. Furthermore, spherical bearing assembly 368 is positioned and located to reduce an overall installation height of LIVE™ unit 302c, as well as provide optimized performance of pylon assembly 306 and related propulsion components.

Upper elastomer member 364 and lower elastomer member 366 seal and resiliently locate piston spindle 356 within the interior of upper housing 344 and lower housing 346. Upper housing 344 and lower housing 346 can each be coupled to piston spindle 356 with an upper adapter 378 and a lower adapter 380, respectively. Upper elastomer member 364 and lower elastomer member 366 function at least as a spring to permit piston spindle 356 to move or oscillate relative to upper housing 344 and lower housing 346. Upper elastomer member 364 and lower elastomer member 366 may be a solid elastomer member, or alternatively may be alternating layers of non-resilient shim members and elastomer layers.

LIVE™ unit 302c also includes an elongated portion 382 integral with piston spindle 356. Elongated portion 382 is configured to define a tuning passage 384. Tuning passage 384 axially extends through elongated portion 382 to provide for fluid communication between upper fluid chamber 352 and lower fluid chamber 354. In the illustrated embodiment, the approximate length $L_1$ of tuning passage 384 coincides with the length $L_1$ of elongated portion 382. Tuning passage 384 is generally circular in cross-section and may be partially tapered longitudinally to provide efficient fluid flow. In other embodiments, tuning passage 384 may be external to housings 344, 346.

A tuning fluid 386 is disposed in upper fluid chamber 352, lower fluid chamber 354 and tuning passage 384. Tuning fluid 386 may have a low viscosity, relatively high density and non-corrosive properties. For example, tuning fluid 386 may be a proprietary fluid such as SPF I manufactured by Lord Corporation. Other embodiments may incorporate hydraulic fluid having suspended dense particulate matter, for example. In another embodiments, the density of tuning fluid 386 may be altered by, for example, adding a substance such as a powder to tuning fluid 386.

A first actuating piston 388 is disposed within upper fluid chamber 352 at one end of LIVE™ unit 302c. A second actuating piston 390 is disposed within lower fluid chamber 354 at the opposing end of LIVE™ unit 302c. Elastomeric seal and spring member 392 resiliently seals first actuating piston 388 within the interior of upper housing 344 and upper reservoir housing 348. In a similar fashion, elastomeric seal and spring member 394 resiliently seals second actuating piston 390 within the interior of lower housing 346 and lower reservoir housing 350. A first tunable active tuning element 396 operably associated with first actuating piston 388 is coupled to upper reservoir housing 348. In a similar fashion, a second tunable active tuning element 398 operably associated with second actuating piston 390 is coupled to lower reservoir housing 350. First and second active tuning elements 396, 398 are each electrically coupled to control circuitry (not shown) for controlling the actuation of first and second actuating pistons 388, 390, respectively. First and second active tuning elements 396, 398 may be piezoelectric tuning elements.

In operation, pylon assembly 306 produces oscillatory forces that cause an oscillatory displacement $u_{pylon}$ of piston spindle 356. The displacement $u_{pylon}$ of piston spindle 356 is transmitted through elastomer members 364, 366 to fuselage airframe 308 via upper and lower housings 344, 346 and spherical bearing assembly 368 resulting in a displacement $u_{fuselage}$. Tuning fluid 386 within tuning passage 384 opposes the oscillatory displacement $u_{pylon}$ of piston spindle 356 with a displacement $u_{tuning\ mass}$ of tuning fluid 386. In addition, first and second active tuning elements 396, 398 are controlled by the control circuitry to selectively actuate first and second actuating pistons 388, 390 resulting in displacements $u_{actuator}$ of first and second actuating pistons 388, 390. Actuation of first and second actuating pistons 388, 390 at a selected frequency and amplitude amplifies the displacement $u_{tuning\ mass}$ of tuning fluid 386 and cancels out the frequency of the oscillatory forces from pylon assembly 306 including dual rotor system 310 and transmission 316. In this manner the oscillatory vibration from pylon assembly 306 is not transferred to the fuselage. It will be appreciated by one of ordinary skill in the art that the locations of active tuning elements 396, 398 may be different than the illustrated embodiment since active tuning elements 396, 398 may act on either the vibrating body or the body to be isolated from vibration.

Implementing active augmented LIVE™ units 302a, 302b, 302c, 302d is effective for isolating vibration for a multiple RPM rotorcraft. For example, active tuning elements 396, 398 may change the isolation frequency of each LIVE™ unit 302a, 302b, 302c, 302d based on the rotational speeds of either or both of top or bottom rotor assemblies 310a, 310b. It should be appreciated that other active actuation methods may be used as well such as hydraulic, electromagnetic or electromechanical actuation methods. Active augmented LIVE™ units 302a, 302b, 302c, 302d also achieve better vibration isolation by overcoming damping losses and adjusting the frequency response characteristics. Further, each opposing pair of LIVE™ units 302a, 302b, 302c, 302d efficiently react against moment oscillations of pylon assembly 306 because the moment can be decomposed into two antagonistic vertical oscillations at each LIVE™ unit 302a, 302b, 302c, 302d.

Main rotor vibration isolation system 300 is configured such that pylon assembly 306 is "soft mounted" with a LIVE™ unit 302a, 302b, 302c, 302d located at each end of a pylon structure 312a, 312b, although LIVE™ units 302a, 302b, 302c, 302d may be tuned to provide stiff mounting of pylon assembly 306. During operation, each LIVE™ unit 302a, 302b, 302c, 302d allows each pylon structure 312a, 312b to float relative to roof beams 308a, 308b through the deformation of upper elastomer member 364, lower elastomer member 366 and spherical elastomeric member 372. Further, it is desirable to minimize the size and complexity of aircraft components in order to minimize weight and expense of the aircraft, thereby maximizing performance and reducing manufacturing associated expenditure. As such, LIVE™ units 302a, 302b, 302c, 302d are uniquely configured to reduce the size and complexity of drive system components. For example, spherical bearing assembly 368 may be configured so that centerline plane 376 of attachment member 370 lies on or near a waterline plane of the driveshaft axis so as to reduce a moment arm that could otherwise contribute to axial (chucking) misalignment. An undesirable moment arm could be produced if centerline plane 376 of attachment member 370 were to lie a significant moment arm distance, as measured in the waterline direction, from the driveshaft axis. Chucking may occur when the engine and transmission 316 translate towards or away from each other. Further, the location of spherical bearing assembly 368 circumferentially around lower housing 346 reduces the overall height of LIVE™ units 302a, 302b, 302c, 302d. A compact main rotor vibration isolation system 300 improves performance by reducing moment arms that can react between components. In other embodiments, LIVE™ units 302a, 302b, 302c, 302d may be passive LIVE™ units.

Dual counter rotating rotor systems such as dual rotor system 310 produce different vibrational harmonics than traditional helicopters with a single rotor system. In particular, dual rotor systems of advancing blade concept rotorcraft introduce dominant blade passage (bp) and 2×blade passage (2 bp) frequencies. Vibration at the bp and 2 bp frequencies from the pylon assembly may be particularly pronounced for dual rotor systems having closely-spaced rotors and stiff hubs and blades. The significant second harmonic (2 bp) of dual counter rotating rotor systems occurs due to blade passage events in which the blades of the upper rotor and lower rotor cross over one another producing a near-periodic and impulsive signature that is most dominant in the upper rotor pitching moment. In the illustrated embodiment, top and bottom rotor assemblies 310a, 310b each include four rotor blades, corresponding to strong vibrational impulses at the four-passage (4p) and eight-passage (8p) frequencies.

Referring to FIGS. 7A-7D in the drawings, the vibrational dynamics of dual rotor system 310 are schematically illustrated. FIG. 7A is a graph 400 showing the blade passage impulses of a dual rotor system having top and bottom rotor assemblies each including four rotor blades. 8p impulse 402 of the dual rotor system is shown in graph 400 as being a dominant vibrational frequency. Graph 400 also shows the effect of the hub pitching moment of the top rotor assembly on the vibrational impulses of dual rotor system 310. As best seen in FIGS. 7B-7C, the top and bottom rotor assemblies of a dual rotor system have a tendency to flap during flight. The top and bottom rotor assemblies may sometimes flap in opposite directions such that the rotor blades are closer together on one side and farther away from each other on the opposite side. Flapping occurs as the advancing blade concept rotorcraft speeds up and the aerodynamics of the rotors change. For example, top and bottom rotor assemblies 404a, 404b may remain substantially parallel and not flap, as shown in FIG. 7B, at lower forward airspeeds such as 55 knots and flap, as shown in FIG. 7C, at higher forward airspeeds such as 150 knots. Dual rotor systems thus tend to have impulsive vibrations that do not necessarily follow a sinusoidal pattern. Deviation from a periodic signature occurs when top and bottom rotor assemblies 404a, 404b flap in opposite directions at high speeds, as shown in FIG. 7C, changing the geometric spacing and hence the time internal spacing between vibratory peaks. At higher speeds, the harmonic nature of the vibration drifts to produce sidebands in the frequency spectrum that may not be well isolated or attenuated in previous vibration isolation systems.

Because dual rotor systems have dominant bp and 2 bp vibrational frequencies such as 4p and 8p frequencies, it is desired to isolate at least these two vibrational frequencies in advancing blade concept rotorcraft. A multi-frequency LIVE™ unit such as a dual frequency LIVE™ unit is thus well-suited for isolating vibrations in advancing blade concept rotorcraft. Frequency response graph 406 in FIG. 7D illustrates a natural frequency 408 of the pylon assembly of the advancing blade concept rotorcraft such as the 4p frequency as well as isolation valleys 410a, 410b produced by a dual frequency LIVE™ unit. It is one aim of the dual frequency LIVE™ unit to couple as closely as possible natural frequency 408 with one of the isolation valleys 410a, 410b produced by the dual frequency LIVE™ unit so that the vibrations caused by the pylon assembly are isolated from the fuselage as much as possible. An active augmented dual frequency LIVE™ unit may be even more effective in isolating natural frequency 408 by inserting negative energy into the system to lower isolation valleys 410a, 410b even further, resulting in a reduction in vibration of 90% or more in some embodiments.

Figure 8A:
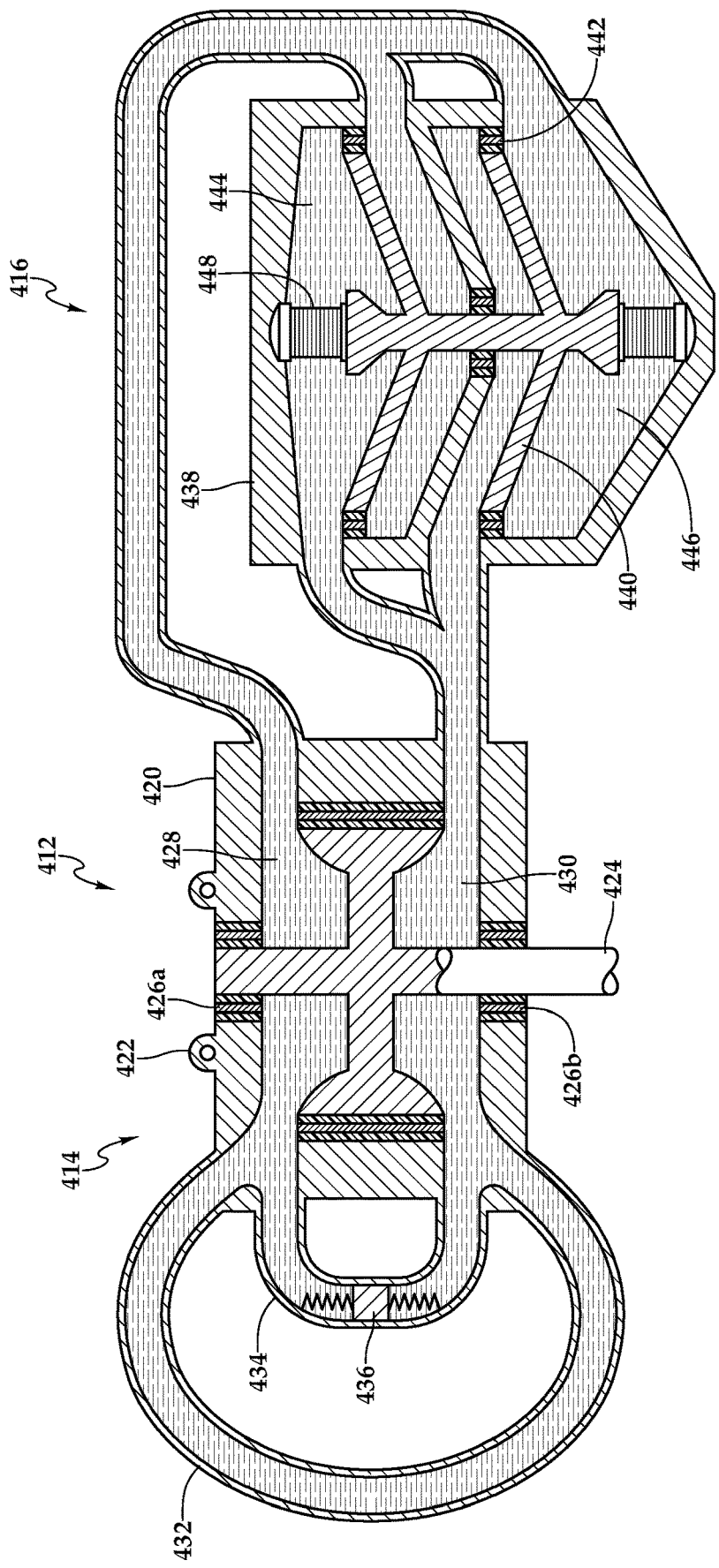
FIGS. 8A-8B are various views of a dual frequency liquid inertia vibration eliminator unit in accordance with embodiments of the present disclosure.
Figure 8B:
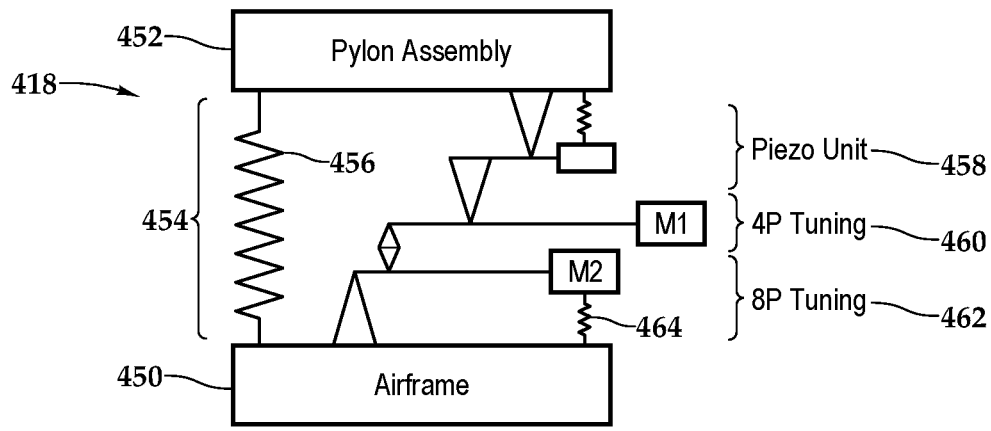

Referring FIGS. 8A-8B in the drawings, an active augmented dual frequency LIVE™ unit for a dual rotor vibration isolation system of an advancing blade concept rotorcraft is schematically illustrated and generally designated 412. Dual frequency LIVE™ unit 412 may be used in lieu of or in combination with LIVE™ units 302a, 302b, 302c, 302d of main rotor vibration isolation system 300 shown in FIGS. 5A-5D. Dual frequency LIVE™ unit 412 is tunable, allows for simultaneous vibration treatment of multiple harmonics and isolates two isolation frequencies such as the bp and 2 bp frequencies or the 4p and 8p frequencies of a dual rotor system to reduce transmission of pylon assembly vibration to the fuselage of an advancing blade concept rotorcraft, although dual frequency LIVE™ unit 412 may be used to isolate frequencies in any aircraft. Dual frequency LIVE™ unit 412 includes a dual frequency LIVE™ portion 414 and a multistage piezo-pumper portion 416. FIG. 8A shows a simplified schematic of dual frequency LIVE™ unit 412 in a cross-sectional view and FIG. 8B shows a mechanical equivalent model 418 of dual frequency LIVE™ unit 412.

Dual frequency LIVE™ portion 414 includes a housing 420 having a mounting portion 422 adapted for connection to a body for which it is desirable to isolate vibration such as pylon assembly 306 and/or pylon structures 312a, 312b of FIGS. 5A-5D (i.e., an isolated body). A piston 424 is resiliently coupled to housing 420 by elastomeric seals 426a, 426b. Housing 420, piston 424 and elastomeric seals 426a, 426b define an upper fluid chamber 428 and a lower fluid chamber 430.

A primary tuning port 432 is in fluid communication with both upper fluid chamber 428 and lower fluid chamber 430. Primary tuning port 432 is configured to allow isolation of harmonic vibration at a first selected frequency such as a bp frequency including a 4p frequency. A secondary tuning port 434 is also in fluid communication with both upper fluid chamber 428 and lower fluid chamber 430. In some embodiments, a spring-mass system 436 is operably associated with secondary tuning port 434. Spring-mass system 436 creates a new degree of freedom. Secondary tuning port 434 allows isolation of harmonic vibration at a second selected frequency such as a 2 bp frequency including an 8p frequency. It will be appreciated that primary tuning port 432 may instead be configured to allow isolation of harmonic vibration at a 2 bp frequency including an 8p frequency and that secondary tuning port 434 may instead be configured to allow isolation of harmonic vibration at a bp frequency including a 4p frequency. First and second tuning ports 432, 434 may also be configured to isolate frequencies other than bp and 2 bp frequencies. The mass of spring-mass system 436 may be zero, allowing the fluid in secondary tuning port 434 to function as the mass operating against the spring in spring-mass system 436. It will be further appreciated that additional tuning ports may be added for applications in which it is desirable to isolate additional harmonic frequencies so that dual frequency LIVE™ unit 412 is instead a multi-frequency LIVE™ unit.

Multistage piezo-pumper portion 416 includes a housing 438 that houses a piston 440. Piston 440 is resiliently coupled to housing 438 by elastomeric seals 442. Housing 438, piston 440 and elastomeric seals 442 define a first fluid chamber 444 and a second fluid chamber 446. First fluid chamber 444 is in fluid communication with upper fluid chamber 428 and second fluid chamber 446 is in fluid communication with lower fluid chamber 430. Piston 440 is actuated by at least one piezoceramic actuator 448.

Piezoceramic actuators 448 actively augment, or tune, the vibration attenuation capability of dual frequency LIVE™ unit 412 in and across both the first selected frequency range and the second selected frequency range such as a first range of frequencies including the bp frequency and a second range of frequencies including the 2 bp frequency. In some embodiments, dual frequency LIVE™ unit 412 is capable of providing greater than 99% isolation in wide frequency ranges with extremely low power. Low power can be achieved because piezoceramic actuators 448 operate at close to a 90 degree phase angle. It should be understood that the dual frequency piezoactuator feature and the multistage piezo-pumper may be utilized independently of each other in a vibration isolation system.

In some embodiments, piezoceramic actuators 448 may be commanded using a Multi-Point Adaptive Vibration Suppression System (MAVSS) algorithm to augment the antiresonance characteristics of dual frequency LIVE™ unit 412, resulting in dramatic reduction in vibration transmissibility into the fuselage airframe. The MAVSS control algorithm is an inherently stable yet robust time domain control methodology that uses traditional Higher Harmonic Control (HHC) techniques of identifying the Fourier components of the disturbance at the frequencies of interest and generating the control command necessary to cancel these disturbances by inverting the plant dynamics at each particular frequency. The MAVSS is programmed to cancel multiple harmonics such as both the 4p vibration and 8p vibration simultaneously. In addition to the system identification aspects of the MAVSS algorithm, an additional feature is the use of an objective function that includes both disturbance and control effort to govern the feedback control process.

Mechanical equivalent model 418 includes a vibrating mass 450 and an isolated mass 452 separated by a dual frequency LIVE™ unit 454. It will be appreciated that the positions of vibrating mass 450 and isolated mass 452 may be reversed without affecting the operation of the system. In the example of FIG. 8B, vibrating mass 450 is an airframe and isolated mass 452 is a pylon assembly. Dual frequency LIVE™ unit 454 comprises at least one spring 456, at least one solid-state actuator 458, a first tuning mass 460, a second tuning mass 462 and a second spring 464. In this case, spring 456 represents elastomeric seals 426a, 426b, first tuning mass 460 represents primary tuning port 432, second tuning mass 462 and second spring 464 represent spring-mass system 436 and solid-state actuator 458 represents piezoceramic actuators 448. It should be understood that mechanical equivalent model 418 is representative of a wide variety of configurations and applications of tunable LIVE™ units. It will be appreciated that a wide variety of LIVE™ units may be used in main rotor vibration isolation system 300 of FIGS. 5A-5D including those described in U.S. Pat. No. 8,499,907, the entire contents of which is hereby incorporated by reference.

Figure 9:
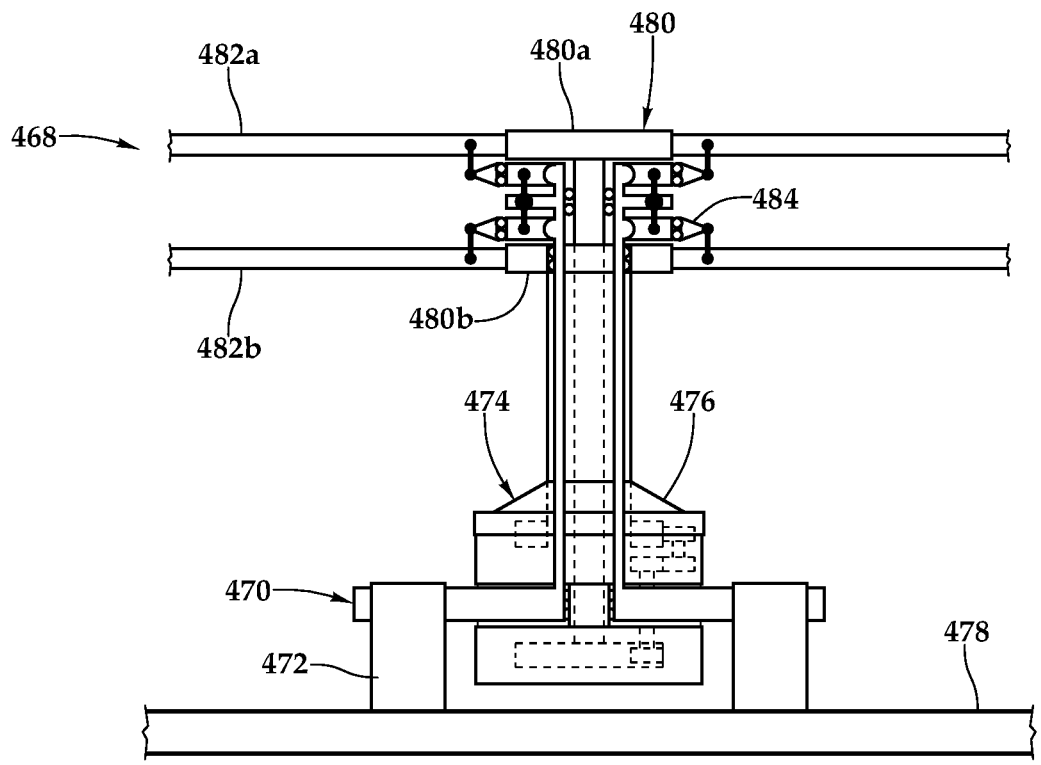
FIG. 9 is a schematic illustration of a pitch control assembly for a dual rotor system of an advancing blade concept rotorcraft in accordance with embodiments of the present disclosure.

Referring to FIG. 9 in the drawings, a main rotor vibration isolation system for an advancing blade concept rotorcraft is schematically illustrated and generally designated 468. Main rotor vibration isolation system 468 includes four corner pylon mount structural assembly 470 having LIVE™ units 472, which may be active, passive, tunable, augmented and/or other types of LIVE™ units. Pylon mount structural assembly 470 supports pylon assembly 474 including transmission 476 atop fuselage airframe 478. Pylon assembly 474 includes dual rotor system 480 having counter rotating top and bottom rotor assemblies 480a, 480b. Top rotor assembly 480a includes variable pitch rotor blades 482a and bottom rotor assembly 480b includes variable pitch rotor blades 482b.

Pylon assembly 474 includes a pitch control assembly 484 to adjust the pitch of rotor blades 482a, 482b. It is desirable to prevent the vibration of pylon assembly 474 including transmission 476 from causing an input to pitch control assembly 484, thereby changing the pitch of rotor blades 482a, 482b in proportion to the vibration of pylon assembly 474. Thus, pitch control assembly 484 is operatively decoupled from pylon assembly 474 such that pylon assembly vibration is independent of, or nonproportional to, the pitch of rotor blades 482a, 482b. Pitch control assembly 484 may be operatively decoupled from pylon assembly 474 in a number of ways, including by configuring pitch control assembly 484 to vibrate with pylon assembly 474 on the pylon assembly-side of LIVE™ units 472. The operative decoupling of pitch control assembly 484 from pylon assembly 474 may be mechanical-based or software-based.

Referring to FIGS. 10A-10C and 11A-11B in the drawings, a vibration isolation system is schematically illustrated and generally designated 500. Vibration isolation system 500 is implemented on advancing blade concept rotorcraft 502, which includes pylon assembly 504 and airframe 506. Pylon assembly 504 includes dual rotor system 508 and transmission 510 and is subject to vibration along multiple degrees of freedom. Vibration isolation system 500 includes left forward pylon link 512 having central axis 512a, right forward pylon link 514 having central axis 514a, left rear pylon link 516 having central axis 516a, and right rear pylon link 518 having central axis 518a. Pylon links 512, 514, 516, 518 may be structurally coupled between airframe 506 and lug mounts on transmission 510, thereby providing the primary structural support for pylon assembly 504. The operationally induced forward, lateral and torsional motions of pylon assembly 504 may be controlled by lateral pylon link 520 and torque restraint and fore/aft vibration isolation subsystem 522. Torque restraint and fore/aft vibration isolation subsystem 522 includes left fore/aft pylon link 524 and right fore/aft pylon link 526. Pylon links 512, 514, 516, 518, 520, 524, 526 may each isolate or control vibration along one or more degrees of freedom of pylon assembly 504.

Figure 10A:
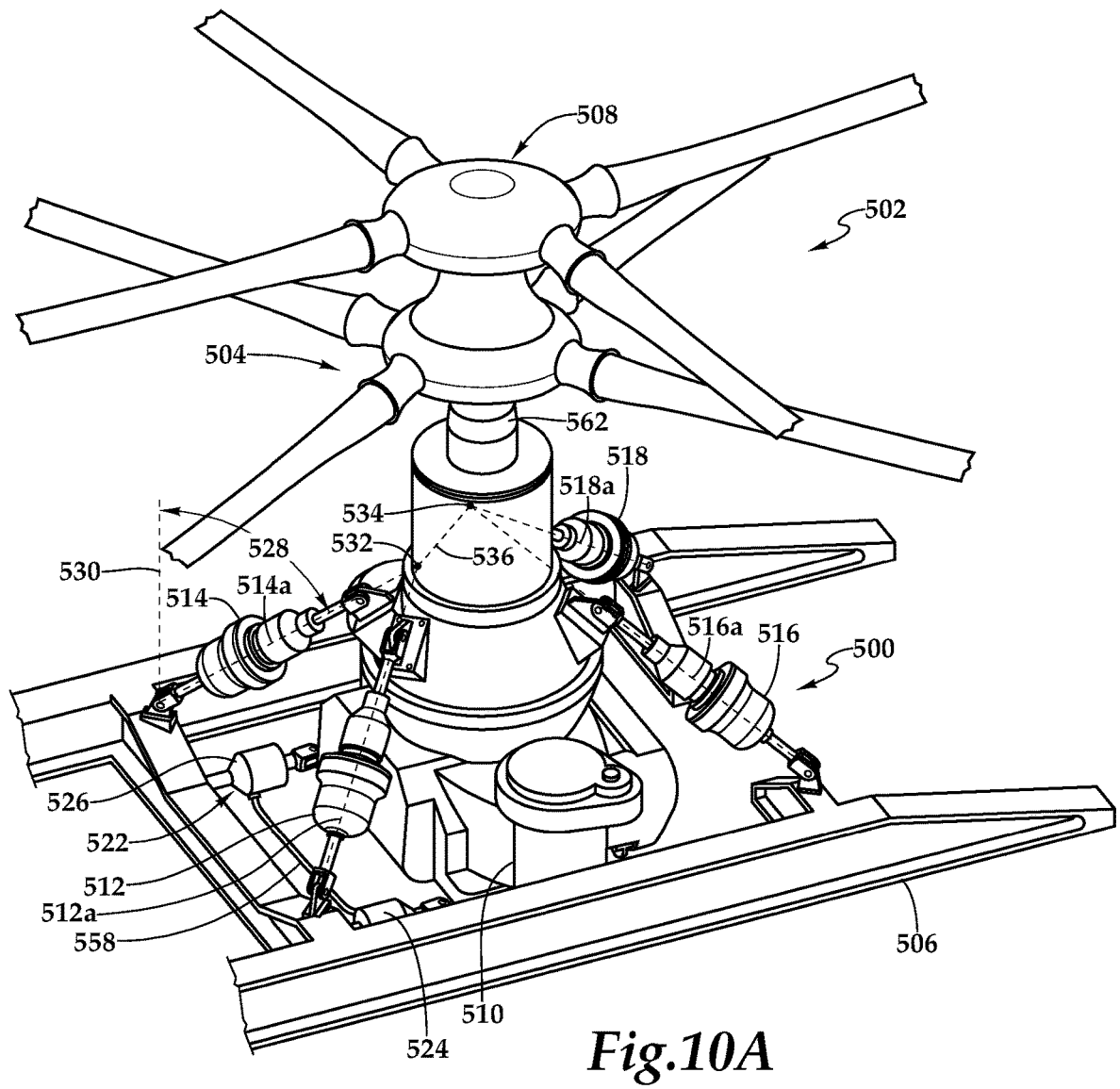
FIGS. 10A-10C are various views of a vibration isolation system implemented on an advancing blade concept rotorcraft in accordance with embodiments of the present disclosure.
Figure 10B:
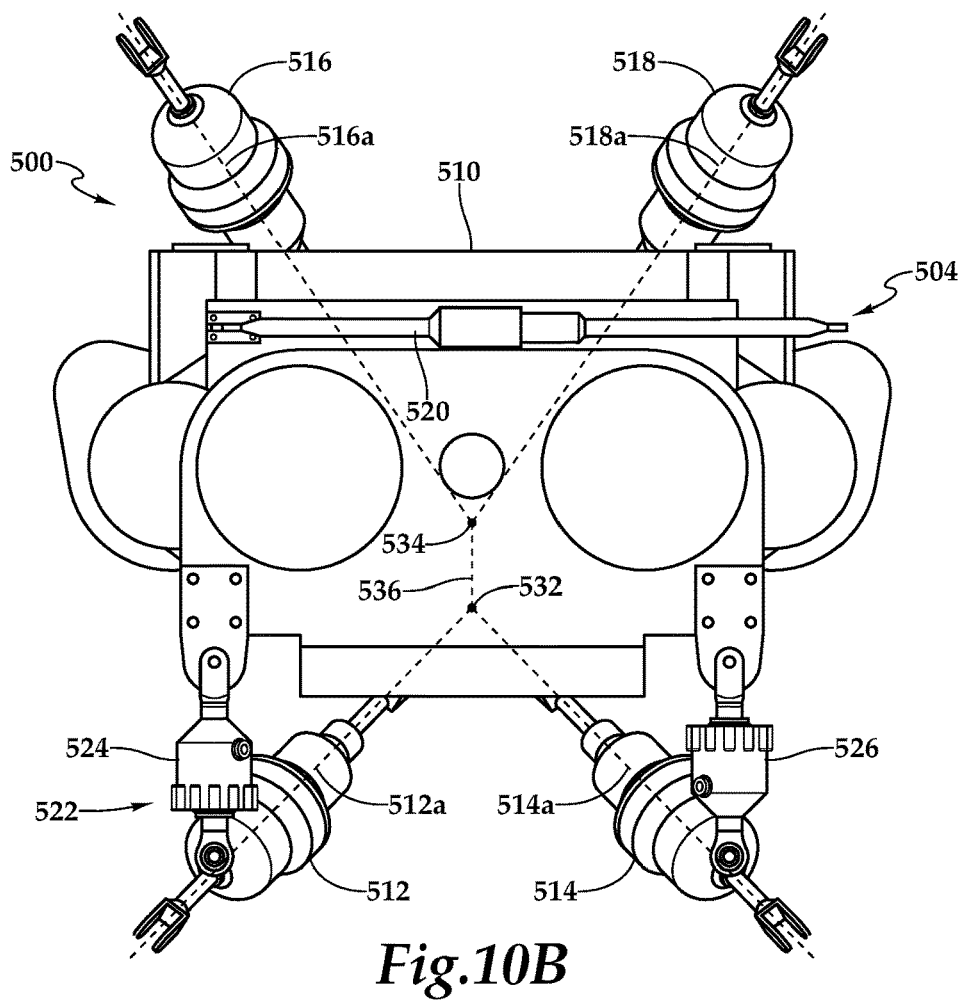

Pylon links 512, 514, 516, 518 are angled pylon links in that each pylon link 512, 514, 516, 518 is neither horizontal nor vertical relative to advancing blade concept rotorcraft 502 but is oriented at some angle therebetween. For example, pylon link 514 may form an angle 528 of between about 20 degrees and 70 degrees with vertical axis 530, which intersects the joint between pylon link 514 and airframe 506. Pylon links 512, 516, 518 may also form such angles with their respective vertical axes. Left forward pylon link 512 and right forward pylon link 514 are oriented such that axes 512a, 514a are non-parallel and converge at a forward focal point 532, thus forming a converging pair of pylon links. Left rear pylon link 516 and right rear pylon link 518 are oriented such that axes 516a and 518a are non-parallel and converge at an aft focal point 534, thus also forming a converging pair of pylon links. Both converging pairs of pylon links 512, 514 and 516, 518 are circumferentially disposed around pylon assembly 504 and, as best seen in FIG. 10B, generally project radially outward from transmission 510.

Aft focal point 534 is located at a higher waterline than forward focal point 532. The distance between forward focal point 532 and aft focal point 534 form a virtual roll axis 536 therebetween. In the illustrated embodiment, both forward focal point 532 and aft focal point 534 lie on a centerline (e.g. zero buttline) of advancing blade concept rotorcraft 502. One advantage of vibration isolation system 500 over conventional mount systems is that by locating forward focal point 532 and aft focal point 534 on different aircraft waterlines, the rolling tendency is substantially decreased. Transmission 510 may have a virtual swing arm between its center of gravity and virtual roll axis 536 with which transmission 510 will have a natural propensity to swing about. However, vibration isolation system 500 is configured such that virtual roll axis 536 is substantially inclined by orienting aft focal point 534 with a substantially higher waterline as compared to forward focal point 532. The inclination of virtual roll axis 536 impedes the swinging of transmission 510, which decreases the loads associated with the swinging of transmission 510.

In the example embodiment, each end of pylon links 512, 514, 516, 518 is coupled to transmission 510 and airframe 506 with spherical bearings to prevent pylon links 512, 514, 516, 518 from reacting to loads in unintended directions. For example, fore/aft loads and torsional loads are not reacted by pylon links 512, 514, 516, 518, but rather by torque restraint and fore/aft vibration isolation subsystem 522. Further, lateral loads are not reacted by pylon links 512, 514, 516, 518, but rather by lateral pylon link 520. Mounting pylon links 512, 514, 516, 518 with spherical bearings helps ensure that each pylon link 512, 514, 516, 518 will only react to loads along its respective axis 512a, 514a, 516a, 518a. Further, prevention of load reaction outside of axes 512a, 514a, 516a, 518a in combination with the freedom to adjust the waterline and fuselage station of forward focal point 532 and aft focal point 534 provide tunability to optimize vibration reduction and reduce the rolling tendency of transmission 510 about virtual roll axis 536.

Pylon links 512, 514, 516, 518, lateral pylon link 520, left fore/aft pylon link 524 and right fore/aft pylon link 526 may each include a vibration isolator. For example, pylon links 512, 514, 516, 518, lateral pylon link 520, left fore/aft pylon link 524 and right fore/aft pylon link 526 may each be "soft" (i.e. not rigid) in that each pylon link may include internal components, such as fluid, orifices, springs, elastomeric members and the like, to isolate vibrations between transmission 510 and airframe 506. Pylon links 512, 514, 516, 518, lateral pylon link 520, left fore/aft pylon link 524 and right fore/aft pylon link 526 may each include a LIVE™ unit that is either passive or active.

Figure 10C:
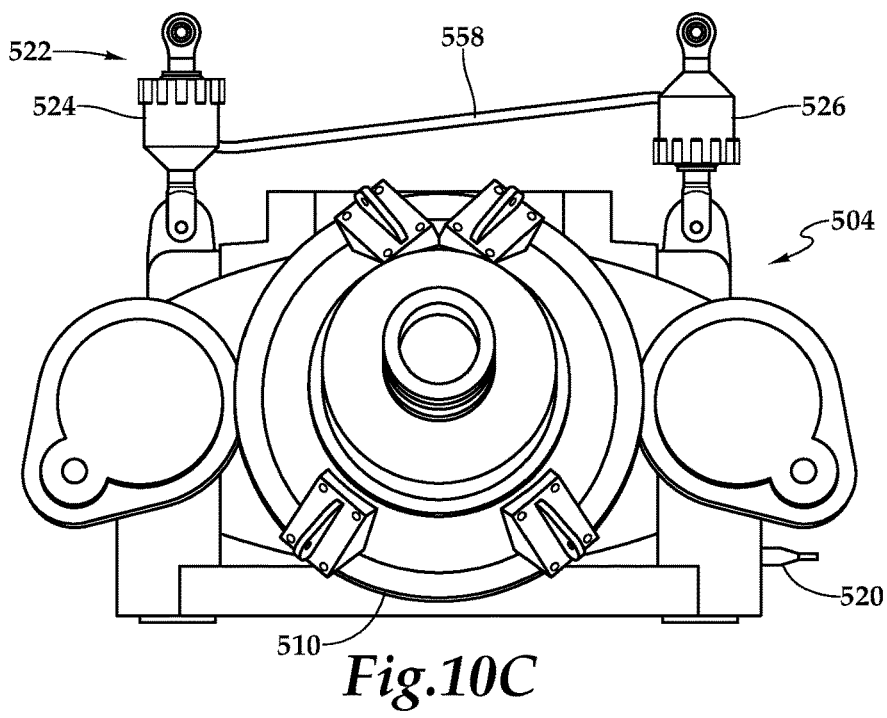
Figure 11A:
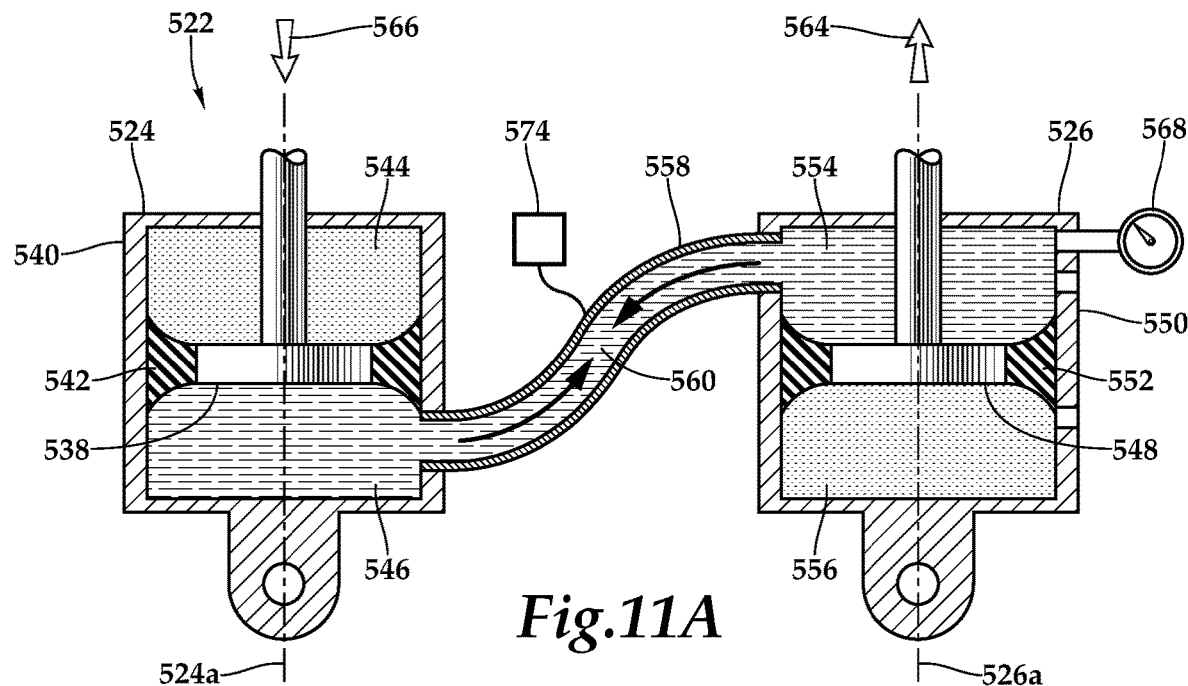
FIGS. 11A-11B are cross-sectional views of a torque restraint and fore/aft vibration isolation subsystem in accordance with embodiments of the present disclosure.
Figure 11B:
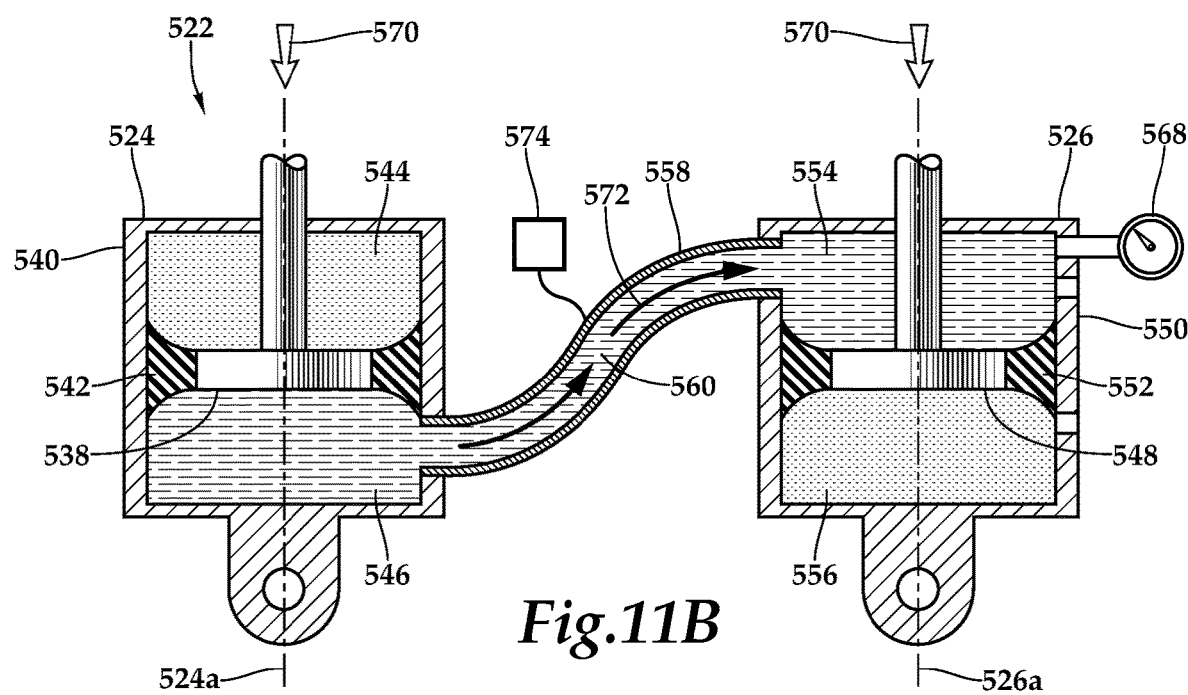

With specific reference to FIGS. 10C and 11A-11B, torque restraint and fore/aft vibration isolation subsystem 522 is illustrated in further detail. Torque restraint and fore/aft vibration isolation subsystem 522 has a substantially horizontal orientation relative to advancing blade concept rotorcraft 502. Torque restraint and fore/aft vibration isolation subsystem 522, including left fore/aft pylon link 524 and right fore/aft pylon link 526, collectively provides not only torque restraint, but also torque measurement and fore/aft vibration isolation. Torque restraint and fore/aft vibration isolation subsystem 522 may be particularly well suited to accompany a primary vibration isolation system, such as pylon links 512, 514, 516, 518 that are configured to not react to fore/aft loads and torque loads. However, it should be appreciated that torque restraint and fore/aft vibration isolation subsystem 522 may accompany a vibration isolation system having any number of pylon links oriented in a variety of different orientations.

Left fore/aft pylon link 524 has a piston 538 resiliently coupled to a housing 540 with an elastomeric member 542. Piston 538 and elastomeric member 542 divide housing 540 into a first chamber 544 and a second chamber 546. Similarly, right fore/aft pylon link 526 has a piston 548 resiliently coupled to a housing 550 with an elastomeric member 552. Piston 548 and elastomeric member 552 divide housing 550 into a first chamber 554 and a second chamber 556. Second chamber 546, first chamber 554 and a fluid line 558 are filled with a fluid 560. First chamber 544 and second chamber 556 do not require fluid 560 and thus can be open or vented rather than being enclosed chambers. For example, first chamber 544 and second chamber 556 can be filled with air, or open/vented to atmosphere.

In operation, torque restraint and fore/aft vibration isolation subsystem 522 is configured to resist or react to torque loads and measure torque loads, as well as attenuate vibration in the fore/aft direction. Referring in particular to FIG. 11A, torque restraint and fore/aft vibration isolation subsystem 522 is illustrated with regard to the reaction and measurement of torque loads. During operation of advancing blade concept rotorcraft 502, some torque or torsional vibration may be carried in mast 562 and into transmission 510. Various maneuvers and operations of advancing blade concept rotorcraft 502 can cause the amount of torque to vary significantly. Pylon links 512, 514, 516, 518 are configured to not react to torque, thus the torque experienced by transmission 510 is reacted to by left fore/aft pylon link 524 and right fore/aft pylon link 526. Preferably, left fore/aft pylon link 524 and right fore/aft pylon link 526 are mounted with spherical bearings so that the torque load is substantially realized as a forward directional load 564 along axis 526a and aft direction load 566 along axis 524a. Forward directional load 564 attempts to pull piston 548 forward, but the equal and opposite aft directional load 566 attempts to push piston 538, thereby creating a fluid lock since fluid 560 in second chamber 546 is in fluid communication with fluid 560 in first fluid chamber 554 via fluid line 558. As such, the torque is restrained with a stiffness that is dependent upon the bulk modulus, or stiffness, of the implementation-specific fluid 560. Furthermore, the amount of torque reacted to by left fore/aft pylon link 524 and right fore/aft pylon link 526 may be measured by a pressure sensor 568. Pressure sensor 568 may be in communication with one or more processors for analysis. In another embodiment, pressure sensor 568 is in communication with a visual gauge in the cockpit of advancing blade concept rotorcraft 502 so that the operator can evaluate the torque in real time. It should be appreciated that the direction of forward directional load 564 and aft direction load 566 can be directionally reversed to accommodate torsional vibrations in both directions.

With specific reference to FIG. 11B, torque restraint and fore/aft vibration isolation subsystem 522 is illustrated with regard to the isolation of oscillatory vibration of pylon assembly 504 in the fore/aft direction. Oscillatory vibration loads can be generated during operation, some of which may have a fore/aft component. An oscillatory load left untreated would be realized as a vibration in advancing blade concept rotorcraft 502. For illustrative purposes, the oscillatory load is schematically shown in an aft direction by arrows 570. However, it should be appreciated that the load oscillates in the fore/aft direction at a certain frequency. When the load is in the aft direction, shown by arrows 570, pistons 538 and 548 are pushed aft, which decreases the volume of fluid 560 in second chamber 546 and increases the volume of fluid 560 in first chamber 554, thereby creating a net shift in fluid 560 in a forward direction 572. The axial shift in fluid 560 acts to cancel the load input in that the mass of the fluid shift creates an inertial mass cancellation of the input. Since the fore/aft load oscillates fore/aft at a certain frequency, torque restraint and fore/aft vibration isolation subsystem 522 employs the principle that the acceleration of an oscillating mass is 180 degrees out of phase with its displacement. Fluid line 558 acts as an inertia track and can be tuned so that torque restraint and fore/aft vibration isolation subsystem 522 attenuates vibration at a desired frequency. Further, if the fore/aft oscillatory load varies, then an optional active pumper 574 can be utilized to actively adjust the isolation frequency by imparting pumping fluid 560 at a frequency that adjusts the isolation frequency.

Figure 12:
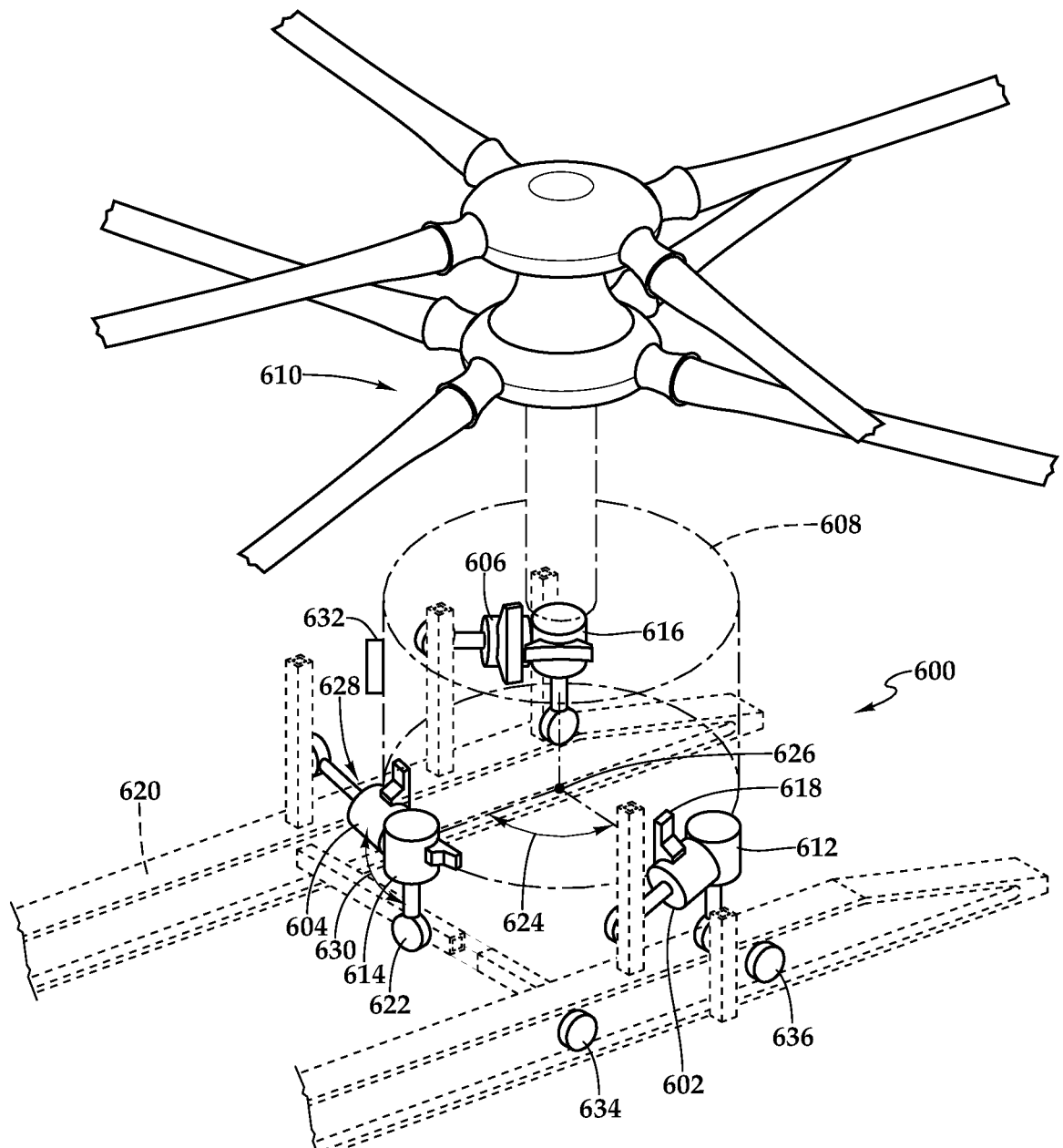
FIG. 12 is an isometric view of a vibration isolation system implemented on an advancing blade concept rotorcraft in accordance with embodiments of the present disclosure.

Referring to FIGS. 12, 13 and 14A-14B in the drawings, vibration isolation systems implemented on an advancing blade concept rotorcraft in various configurations are schematically illustrated. The vibration isolation systems in FIGS. 12, 13 and 14A-14B are each configured to isolate vibration of a pylon assembly along multiple degrees of freedom and are exemplary of the wide range of configurations in which the illustrative embodiments may be implemented. In FIG. 12, vibration isolation system 600 includes substantially horizontal pylon links 602, 604, 606 circumferentially disposed around transmission 608 of pylon assembly 610. Horizontal pylon links 602, 604, 606 may each, in some embodiments, be angularly offset from the horizontal plane within a range of between 0 and 20 degrees. Vibration isolation system 600 also includes substantially vertical pylon links 612, 614, 616 circumferentially disposed around transmission 608. Horizontal and vertical pylon links 602, 604, 606, 612, 614, 616 each include a vibration isolator (not shown), such as a LIVE™ unit. One end of each horizontal and vertical pylon link 602, 604, 606, 612, 614, 616 may be coupled to transmission 608 using brackets 618 while the opposite end of each pylon link 602, 604, 606, 612, 614, 616 is coupled to airframe 620 using fuselage or airframe attachment bearings 622. Vertical pylon links 612, 614, 616 may be circumferentially equidistant from one another such that adjacent vertical pylon links form an approximately 120 degree angle 624 with a vertex located at central axis 626 of pylon assembly 610. Each pair 628 of horizontal and vertical pylon links, such as horizontal pylon link 604 and vertical pylon link 614, forms an angle 630 therebetween in a range between 70 and 110 degrees. The configuration of vibration isolation system 600 may be particularly useful for pylon assemblies having high nodal points. In some embodiments, vertical pylon links 612, 614, 616 may control vertical vibration of pylon assembly 610 while horizontal pylon links 602, 604, 606 control torsional vibration and horizontal, including lateral and longitudinal, vibration of pylon assembly 610.

Vibration isolation system 600 may be used in conjunction with one or more active force generators 632, 634, 636.

Active force generators 632, 634, 636 are operable to produce a force that counteracts the vibration of pylon assembly 610, thereby reducing vibration of the advancing blade concept rotorcraft. Active force generators 632, 634, 636 may be linear force generators, circular or rotary force generators or other suitable force generators. For example, active force generators 632, 634, 636 may be spring masses or shakers, including rotary hub-mounted shakers. It will be understood by one of ordinary skill in the art that the types of active force generators that may be implemented in vibration isolation system 600 are numerous, and that each of these types of active force generators may be implemented, in any combination, simultaneously with the illustrative embodiments.

Figure 13:
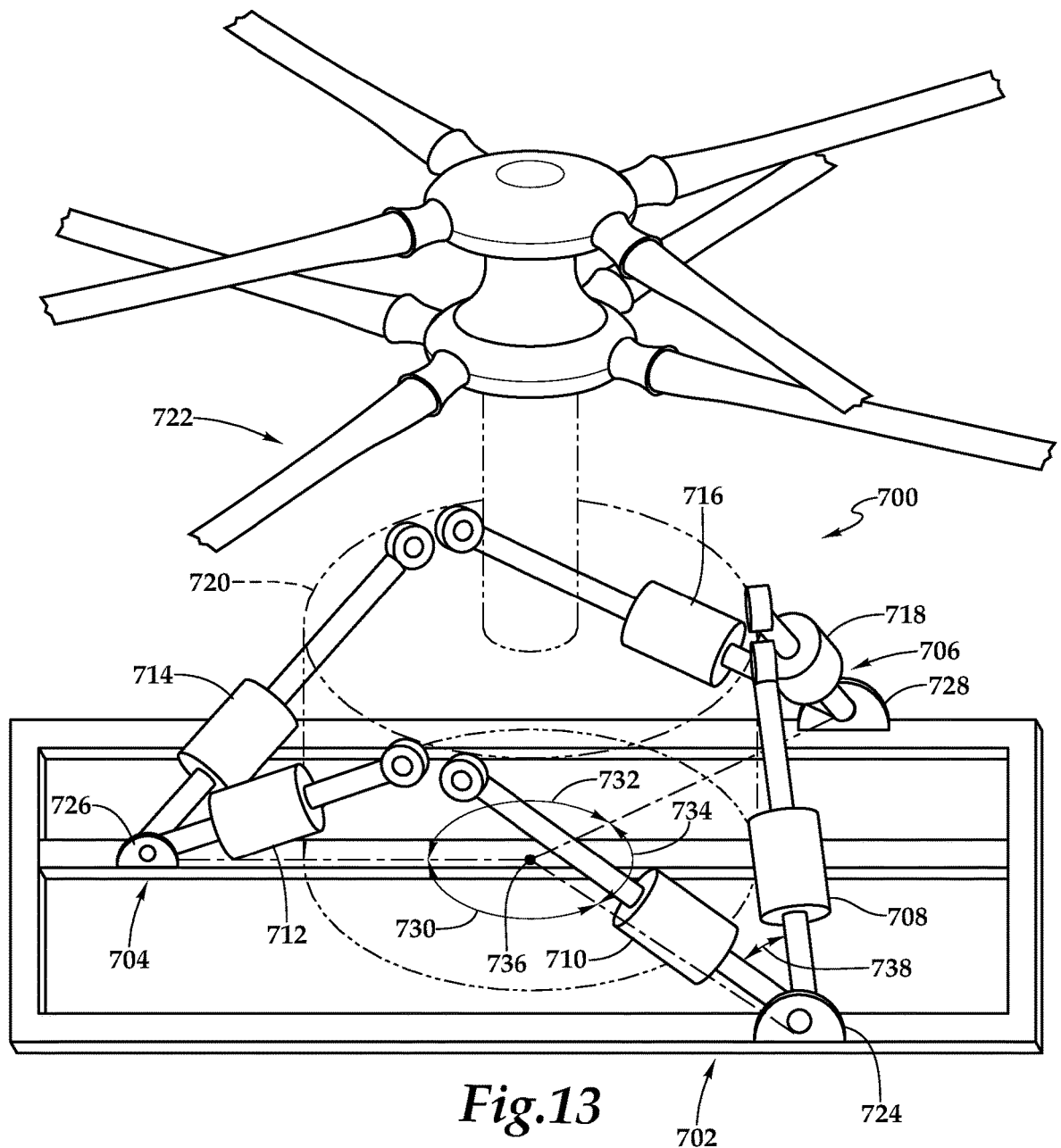
FIG. 13 is an isometric view of a vibration isolation system implemented on an advancing blade concept rotorcraft in accordance with embodiments of the present disclosure.

In FIG. 13, vibration isolation system 700 includes three converging pairs 702, 704, 706 of angled pylon links 708, 710, 712, 714, 716, 718 circumferentially disposed around transmission 720 of pylon assembly 722. Each pylon link 708, 710, 712, 714, 716, 718 includes a vibration isolator (not shown), such as a LIVE™ unit. Each converting pair 702, 704, 706 includes two non-parallel pylon links 708 and 710, 712 and 714, 716 and 718 that converge at airframe connections 724, 726, 728, respectively. In some embodiments, airframe connections 724, 726, 728 may be circumferentially non-equidistant from one another such that angles 730 and 732 are each larger than angle 734, with central axis 736 of pylon assembly 722 acting as the vertex. In one non-limiting example, angles 730, 732 are each approximately 135 degrees and angle 734 is approximately 90 degrees. Angle 738 between the pylon links of each convergent pair 702, 704, 706 may be any acute angle. Vibration isolation system 700 may be particularly useful when implemented on pylon assemblies having high nodal points.

Figure 14A:
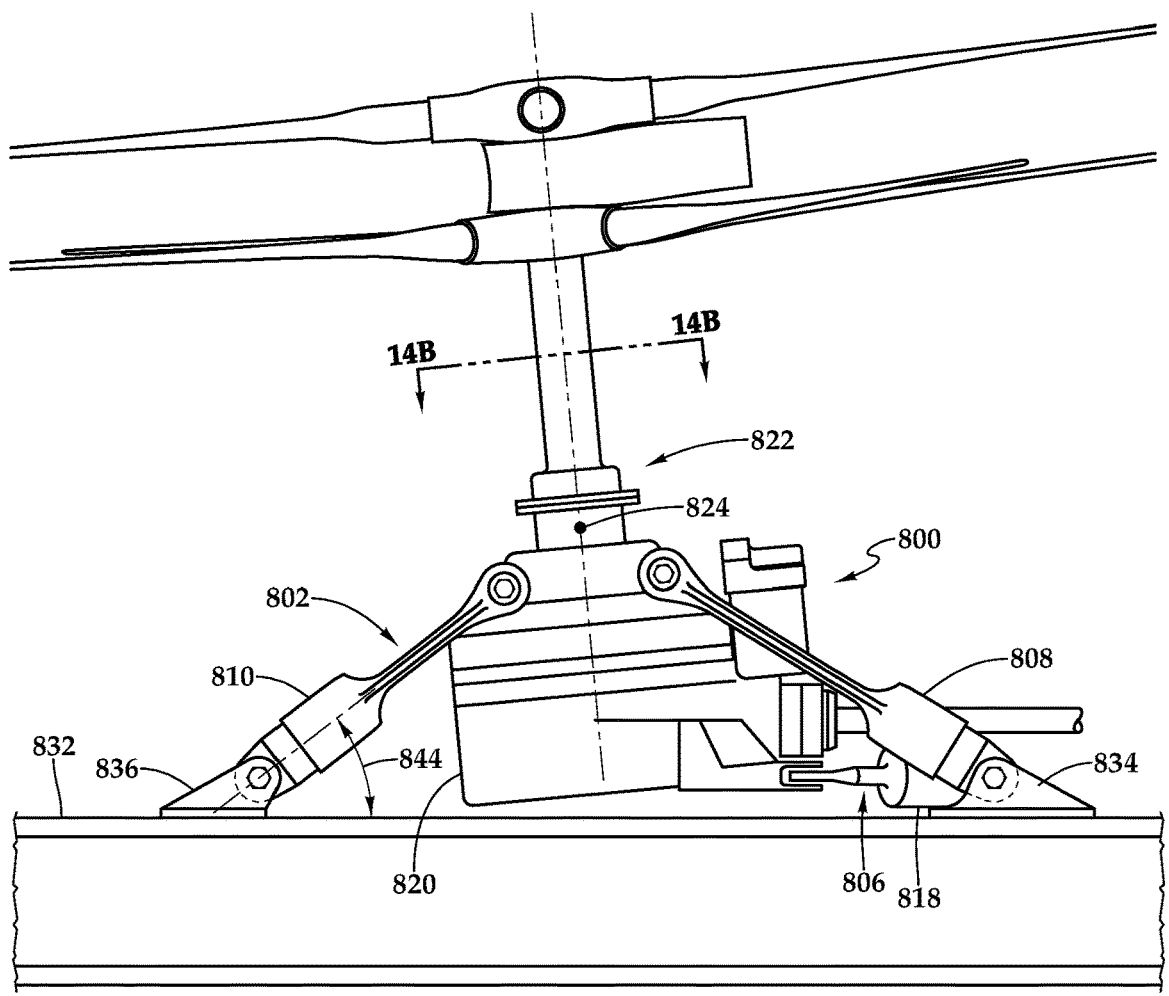
FIGS. 14A-14B are various views of a vibration isolation system implemented on an advancing blade concept rotorcraft in accordance with embodiments of the present disclosure.
Figure 14B:
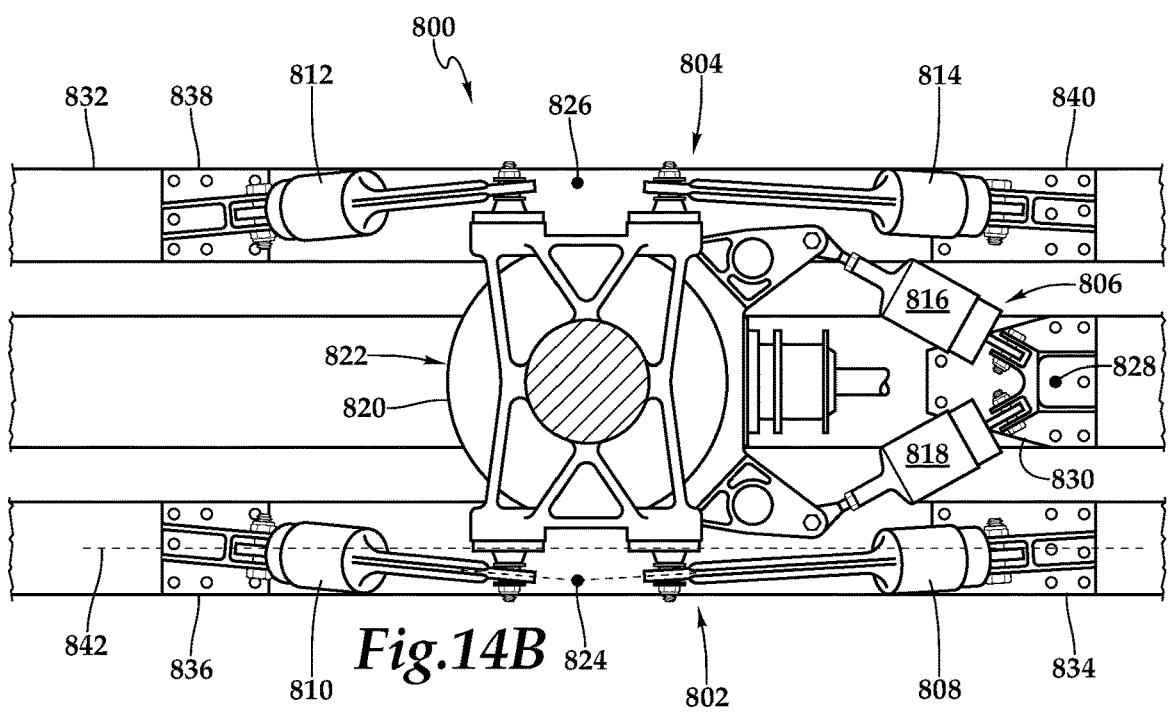

In FIGS. 14A-14B, vibration isolation system 800 includes three converging pairs 802, 804, 806 of angled pylon links 808, 810, 812, 814, 816, 818 circumferentially disposed around transmission 820 of pylon assembly 822. Each pylon link 808, 810, 812, 814, 816, 818 includes a vibration isolator (not shown), such as a LIVE™ unit. Converging pairs 802, 804, 806 each include two pylon links that are non-parallel and have axes that converge at a focal point. In particular, converging pairs 802, 804, 806 converge at focal points 824, 826, 828, respectively. Focal point 828 at which pylon links 816, 818 converge is located at pylon support fitting 830, which anchors pylon links 816, 818 to airframe 832. Focal points 824, 826 of converging pairs 802, 804, respectively, have higher waterlines located at or near the top of transmission 820. Pylon links 808, 810, 812, 814 are each anchored to airframe 832 using pylon support fittings 834, 836, 838, 840, respectively. Pylon support fittings 834 and 836, 838 and 840 corresponding to each converging pair 802, 804, respectively, are substantially collinear along a fore/aft axis of the advancing blade concept rotorcraft. For example, pylon support fittings 834, 836 of converging pair 802 are substantially collinear along fore/aft axis 842. Pylon links 808, 810, 812, 814 may each form any acute angle 844 with airframe 832. Pylon links 816, 818 may be particularly adapted to control vibration of pylon assembly 822 in the fore/aft and lateral directions, while pylon links 808, 810, 812, 814 control vibration in the remaining degrees of freedom.

Figure 15A:
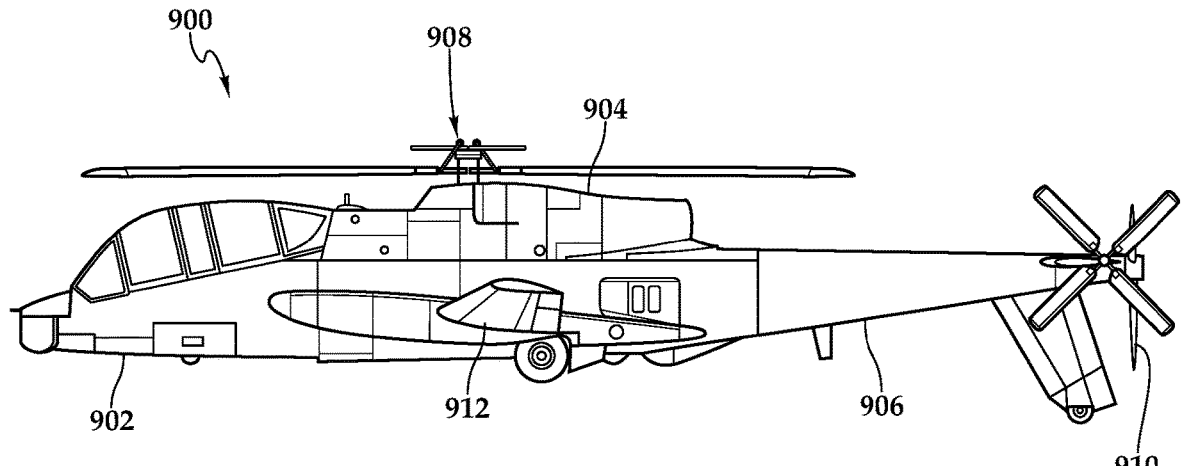
FIGS. 15A-15B are schematic illustrations of a compound helicopter utilizing a vibration isolation system in accordance with embodiments of the present disclosure.
Figure 15B:
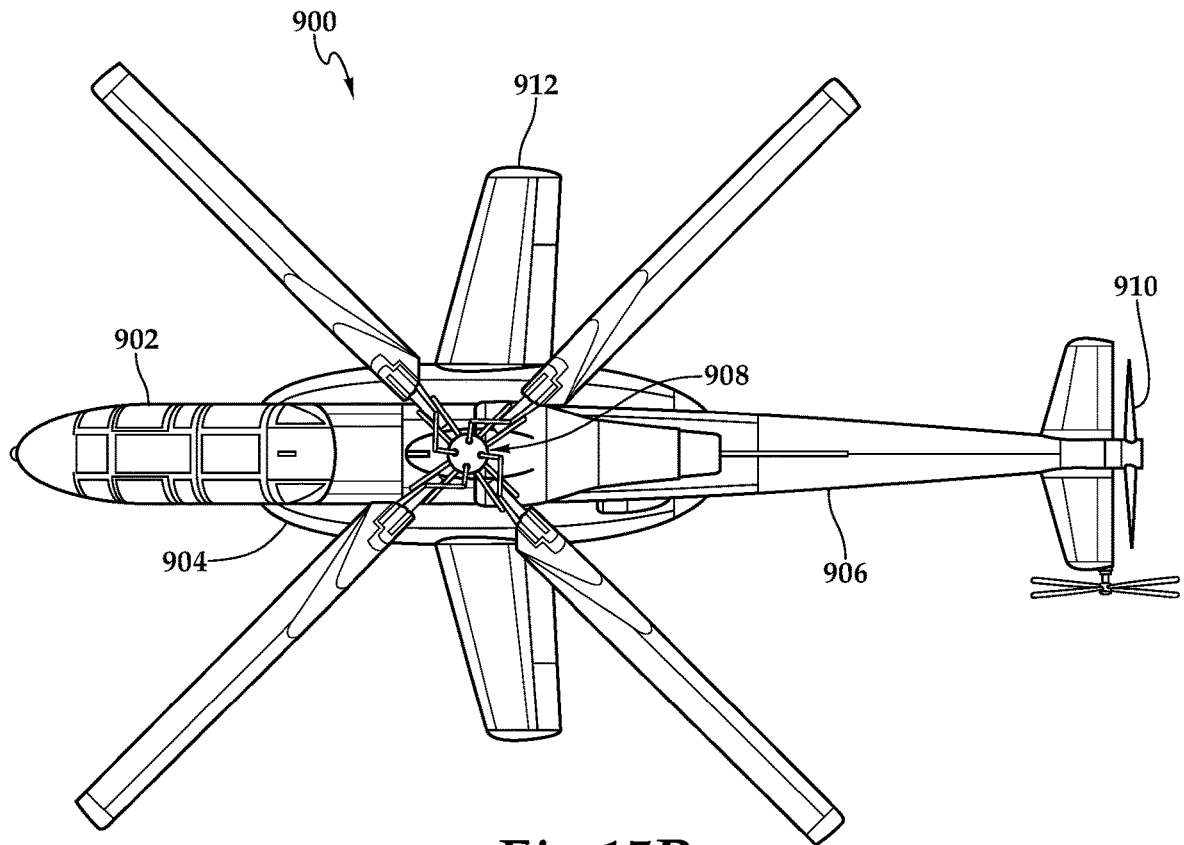

Referring to FIGS. 15A-15B in the drawings, a compound helicopter capable of vertical takeoff and landing (VTOL) is schematically illustrated and generally designated 900. Compound helicopter 900 includes a fuselage 902 supported by a fuselage airframe 904. A tailboom 906 extends aft of fuselage 902. Unlike the advancing blade concept rotorcraft discussed herein, compound helicopter 900 has a single rotor system 908. In the illustrated embodiment, rotor system 908 has four rotor blades, but may include any number of rotor blades. Compound helicopter 900 has a translational thrust system located at the aft end of tailboom 906 including a pusher propeller 910 that propels compound helicopter 900 in a forward direction. Assisted by pusher propeller 910, compound helicopter 900 may be capable of high forward airspeed. By providing for propulsion for compound helicopter 900, pusher propeller 910 may reduce the drag burden on rotor system 908. Pusher propeller 910 may be a variable pitch pusher propeller and may be clutchable. Pusher propeller 910 may be powered by an engine via a gearbox. While shown in the context of a pusher propeller configuration, it will be understood by one of ordinary skill that pusher propeller 910 may also be a more conventional puller propeller or could be variably facing so as to provide yaw control in addition to or instead of translational thrust. Compound helicopter 900 also includes a wing 912. Wing 912 provides additional lift for compound helicopter 900 in forward flight, further alleviating the lift burden on rotor system 908. Because the various components of compound helicopter 900 are subject to vibration including wing 912 and the pylon supporting rotor system 908, compound helicopter 900 includes both a wing vibration isolation system and a main rotor vibration isolation system.

Figure 16:
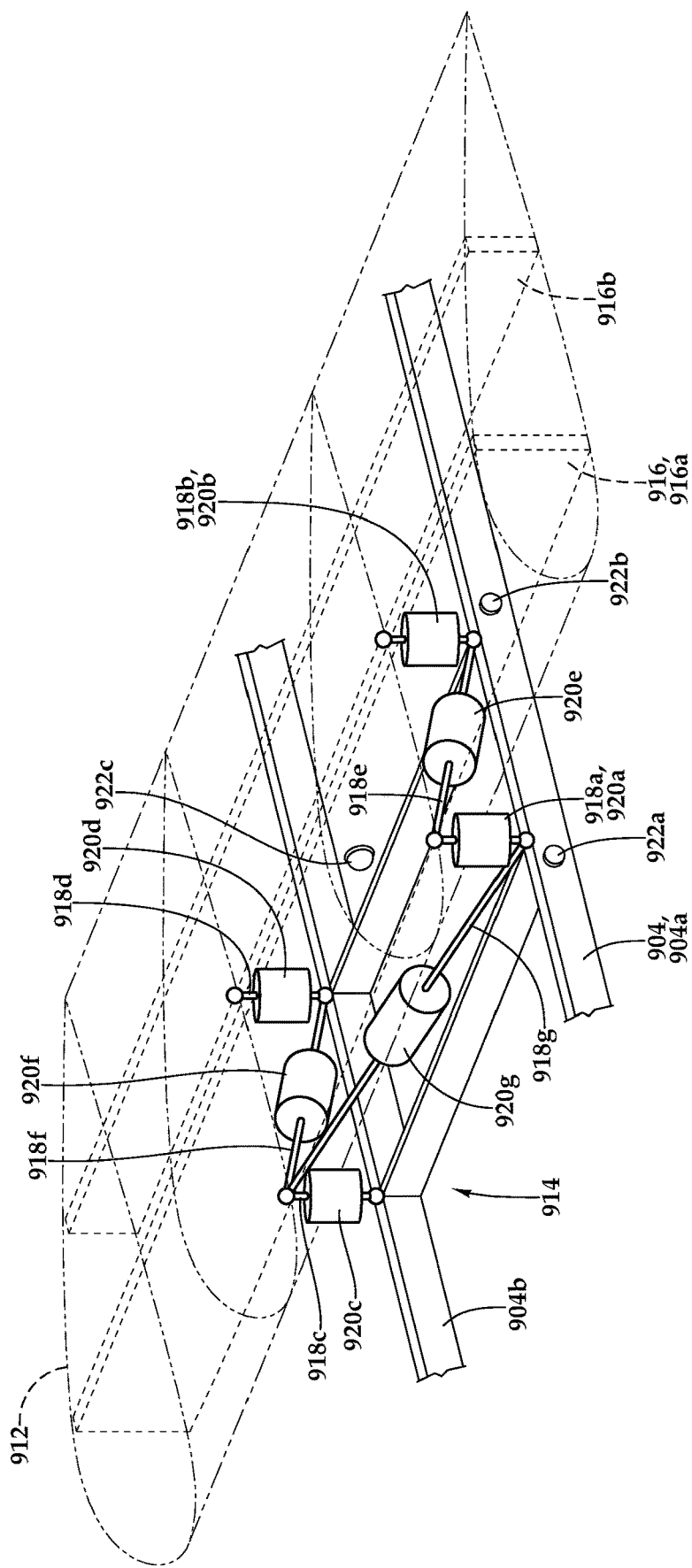
FIG. 16 is an isometric view of a wing vibration isolation system for a compound helicopter in accordance with embodiments of the present disclosure.

Referring to FIG. 16 in the drawings, a wing vibration isolation system for compound helicopter 900 is schematically illustrated and generally designated 914. Wing 912 including wing airframe 916 is subject to vibration from a variety of sources including rotorwash from rotor system 908. Previously, compound helicopters have relied on static wings that are rigidly coupled to a fuselage airframe. Compound helicopter 900 isolates wing vibration from fuselage airframe 904 using wing vibration isolation system 914. Wing vibration isolation system 914 includes one or more links 918a, 918b, 918c, 918d, 918e, 918f, 918g coupled to wing airframe 916 and fuselage airframe 904. Each link 918a, 918b, 918c, 918d, 918e, 918f, 918g includes a respective LIVE™ unit 920a, 920b, 920c, 920d, 920e, 920f, 920g, each configured to reduce the transmission of wing vibration to fuselage airframe 904. LIVE™ units 920a, 920b, 920c, 920d, 920e, 920f, 920g may be passive LIVE™ units and/or active LIVE™ units including augmented, multi-frequency, tunable and/or other types of LIVE™ units. LIVE™ units 920a, 920b, 920c, 920d, 920e, 920f, 920g may also be a combination of both passive LIVE™ units and active LIVE™ units. For example, any or all of LIVE™ units 920a, 920b, 920c, 920d, 920e, 920f, 920g may be passive LIVE™ units such as LIVE™ unit 232 described in FIGS. 4A-4B. In another example, any or all of LIVE™ units 920a, 920b, 920c, 920d, 920e, 920f, 920g may be active LIVE™ units such as LIVE™ unit 302c described in FIGS. 6A-6B, LIVE™ unit 414 described in FIGS. 8A-8B and/or any other LIVE™ unit described herein or incorporated by reference.

Links 918a, 918b, 918c, 918d, 918e, 918f, 918g include parallel and vertically-oriented links 918a, 918b, 918c, 918d, which may be particularly useful in countering vibration caused by rotorwash from rotor system 908. Links 918a, 918b, 918c, 918d are coupled to spars 916a, 916b of wing airframe 916 and left and right support beams 904a, 904b of fuselage airframe 904. More particularly, the top end of link 918a is coupled to front spar 916a and the bottom end of link 918a is coupled to left support beam 904a, the top end of link 918b is coupled to aft spar 916b and the bottom end of link 918b is coupled to left support beam 904a, the top end of link 918c is coupled to front spar 916a and the bottom end of link 918c is coupled to right support beam 904b and the top end of link 918d is coupled to aft spar 916b and the bottom end of link 918d is coupled to right support beam 904b.

Links 918a, 918b, 918c, 918d, 918e, 918f, 918g also include diagonally-oriented links 918e, 918f between front links 918a, 918c and aft links 918b, 918d. The top ends of diagonally-oriented links 918e, 918f are coupled to front spar 916a and the bottom ends of diagonally-oriented links 918e, 918f are coupled to left and right support beams 904a, 904b, respectively. Alternatively, the orientations of diagonally-oriented links 918e, 918f may be reversed such that the top ends of diagonally-oriented links 918e, 918f are coupled to aft spar 916b. Links 918a, 918b, 918c, 918d, 918e, 918f, 918g also include diagonally-oriented lateral link 918g located between left links 918a, 918b and right links 918c, 918d. One or more diagonally-oriented lateral links such as diagonally-oriented lateral link 918g may be located between links 918a, 918c and/or between links 918b, 918d. In the illustrated embodiment, the top end of diagonally-oriented lateral link 918g is coupled to front spar 916a and the bottom end of diagonally-oriented lateral link 918g is coupled to left support beam 904a, although this orientation may be reversed. It will be appreciated that any combination of links 918a, 918b, 918c, 918d, 918e, 918f, 918g may alternatively be coupled to one or more ribs (not shown) of wing airframe 916. Wing vibration isolation system 914 may be implemented on any type of compound helicopter that has one or more wings including advancing blade concept rotorcraft.

In some embodiments, wing vibration isolation system 914 may include one or more supplementary vibration management devices 922a, 922b, 922c to provide supplementary vibration control of wing 912 in addition to LIVE™ units 920a, 920b, 920c, 920d, 920e, 920f, 920g. Supplementary vibration management devices 922a, 922b, 922c may be or include any combination of Frahms, passive spring mass absorbers, active spring mass absorbers, active hub shakers, active force generators, pendulums and/or hub active vibration control systems. In embodiments in which supplementary vibration management devices 922a, 922b, 922c are Frahms, the Frahms may be modified with active piezoceramic tuning elements. In embodiments in which supplementary vibration management devices 922a, 922b, 922c are active force generators, supplementary vibration management devices 922a, 922b, 922c may produce forces in different directions to cancel the multidirectional oscillations of wing 912. Among the types of active force generators that may be used to control vibration are active force generators manufactured by Moog® Inc. Wing vibration isolation system 914 may include any number of supplementary vibration management devices disposed at any location relative to wing 912 including anywhere on fuselage airframe 904 and/or wing 912 including wing airframe 916.

Figure 17:
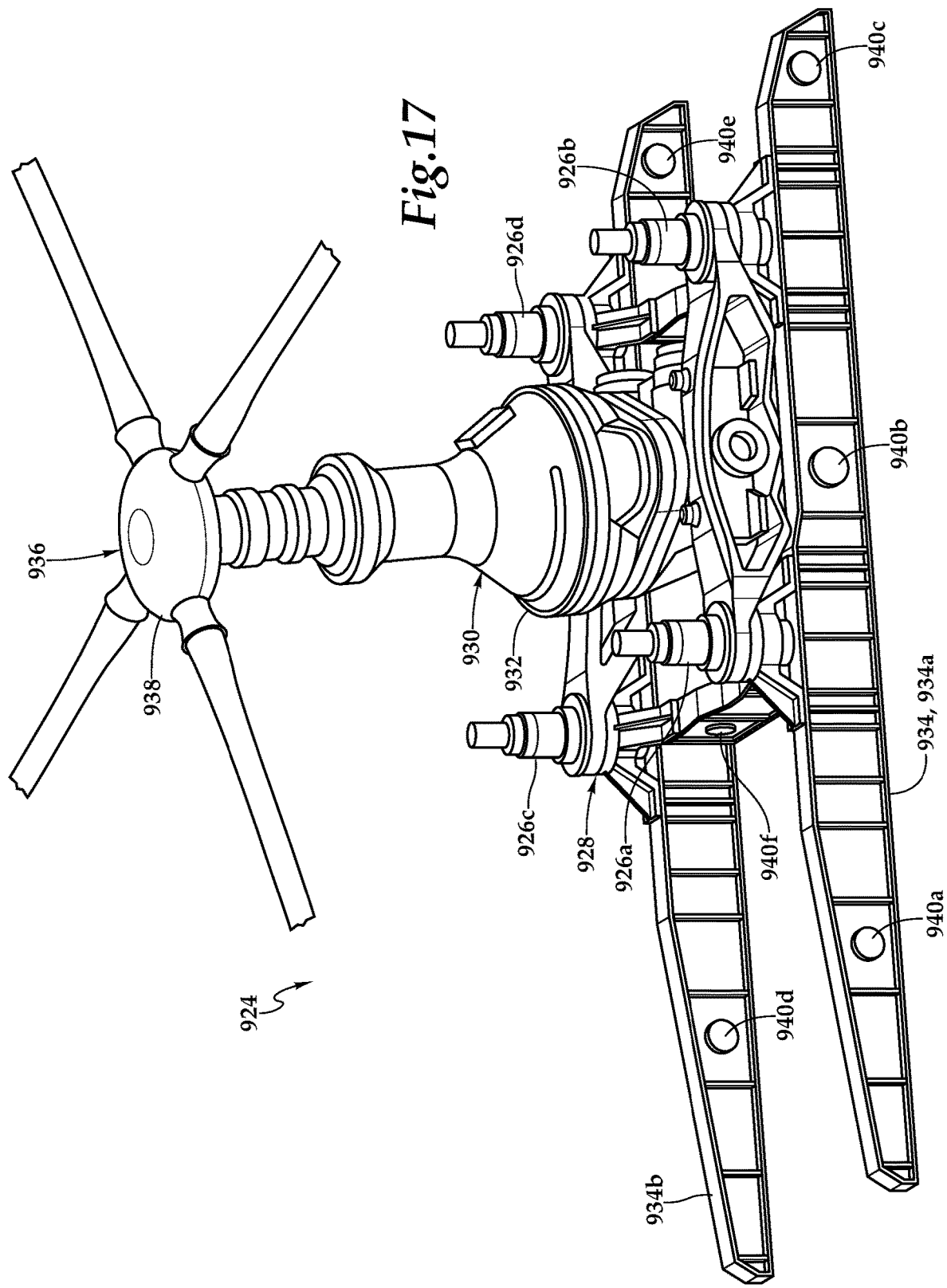
FIG. 17 is an isometric view of a main rotor vibration isolation system implemented on a compound helicopter in accordance with embodiments of the present disclosure.

Referring to FIG. 17 in the drawings, a main rotor vibration isolation system for compound helicopter 900 is schematically illustrated and generally designated 924. Previous compound helicopters have relied on rigid pylons in conjunction with Frahms or active force generators to treat pylon vibration. This approach has proven ineffective to treat the larger vibrations in compound helicopters resulting from a faster forward airspeed. Main rotor vibration isolation system 924 includes a LIVE™ unit 926a, 926b, 926c, 926d located in each corner of a four corner pylon mount structural assembly 928 that supports pylon assembly 930 including transmission 932 atop fuselage airframe 934 including roof beams 934a, 934b. Pylon assembly 930 includes single rotor system 936 having a main rotor assembly 938 with four rotor blades radially emanating therefrom, although main rotor assembly 938 may have any number of rotor blades such as less than four or more than four rotor blades. Four corner pylon mount structural assembly 928 has the same or similar features as four corner pylon mount structural assembly 304 in FIGS. 5A-5D except that four corner pylon mount structural assembly 928 supports a single rotor system instead of a dual rotor system. It will be appreciated that any of the pylon configurations disclosed herein may be used on compound helicopter 900.

LIVE™ units 926a, 926b, 926c, 926d are generally parallel, vertically-oriented and configured to reduce transmission of the pylon assembly vibration to fuselage airframe 934 at one or more isolation frequencies. LIVE™ units 926a, 926b, 926c, 926d may be passive LIVE™ units and/or active LIVE™ units including augmented, multi-frequency, tunable and/or other types of LIVE™ units. LIVE™ units 926a, 926b, 926c, 926d may also be a combination of both passive LIVE™ units and active LIVE™ units. For example, any or all of LIVE™ units 926a, 926b, 926c, 926d may be passive LIVE™ units such as LIVE™ unit 232 described in FIGS. 4A-4B. In another example, any or all of LIVE™ units 926a, 926b, 926c, 926d may be active LIVE™ units such as LIVE™ unit 302c described in FIGS. 6A-6B, LIVE™ unit 414 described in FIGS. 8A-8B and/or any other LIVE™ unit described herein or incorporated by reference. In one specific non-limiting example, all or a portion of LIVE™ units 926a, 926b, 926c, 926d may be augmented LIVE™ units having one or more active tuning elements such as those described herein, which are movable to tune the isolation frequency of the augmented LIVE™ units. In such an example, the active tuning element(s) may change the isolation frequency of the augmented LIVE™ units based on the rotational speed of main rotor assembly 938.

In some embodiments, pylon assembly 930 may include a pitch control assembly (not shown) to adjust the pitch of the rotor blades of main rotor assembly 938. Similar to pitch control assembly 484 in FIG. 9, the pitch control assembly of pylon assembly 930 may be operatively decoupled from pylon assembly 930 such that the vibration of pylon assembly 930 is independent of the pitch of the rotor blades of main rotor assembly 938. In some embodiments, main rotor vibration isolation system 924 may include one or more supplementary vibration management devices 940a, 940b, 940c, 940d, 940e, 940f to provide supplementary vibration control of pylon assembly 930 in addition to LIVE™ units 926a, 926b, 926c, 926d. Supplementary vibration management devices 940a, 940b, 940c, 940d, 940e, 940f may be or include any combination of Frahms, passive spring mass absorbers, active spring mass absorbers, active hub shakers, active force generators, pendulums and/or hub active vibration control systems. In embodiments in which supplementary vibration management devices 940a, 940b, 940c, 940d, 940e, 940f are Frahms, the Frahms may be modified with active piezoceramic tuning elements. In embodiments in which supplementary vibration management devices 940a, 940b, 940c, 940d, 940e, 940f are active force generators, supplementary vibration management devices 940a, 940b, 940c, 940d, 940e, 940f may produce forces in different directions to cancel the multidirectional oscillations of pylon assembly 930. For example, supplementary vibration management device 940b may produce vertical forces, supplementary vibration management devices 940a, 940c, 940d, 940e may produce forces in the longitudinal direction and supplementary vibration management device 940f may produce forces in the lateral direction. Among the types of active force generators that may be used to control vibration are active force generators manufactured by Moog® Inc. Main rotor vibration isolation system 924 may include any number of supplementary vibration management devices disposed at any location relative to pylon assembly 930 including anywhere on fuselage airframe 934, pylon mount structural assembly 928 and/or pylon assembly 930 itself.

Figure 18:
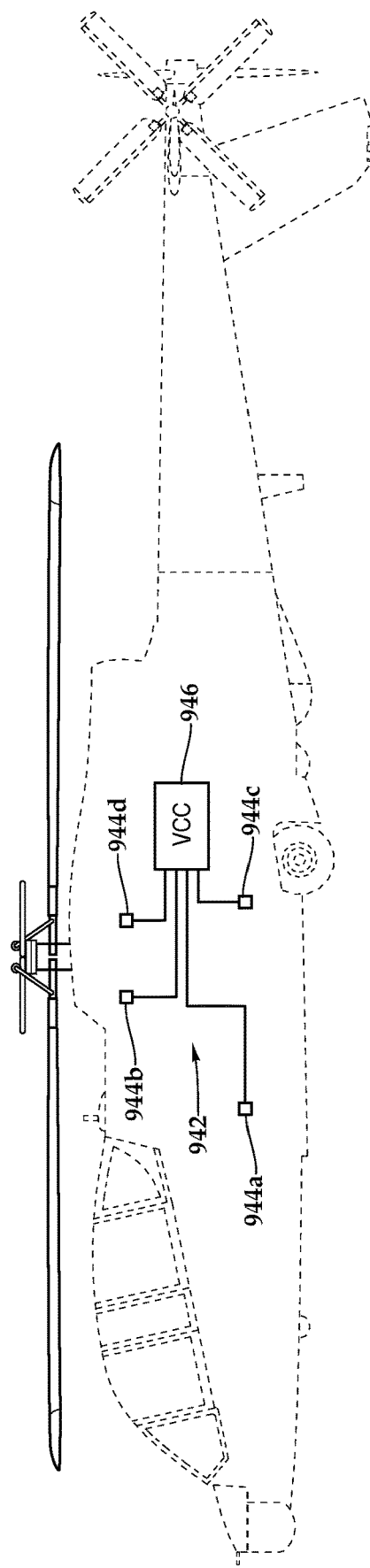
FIG. 18 is a schematic view of an active vibration control system for a compound helicopter in accordance with embodiments of the present disclosure.

Referring to FIG. 18 in the drawings, an active vibration control system 942 is illustrated. Active vibration control system 942 includes a plurality of vibration feedback sensors 944a, 944b, 944c, 944d in communication with a vibration control computer 946. Vibration control computer 946 is in communication with each active LIVE™ unit in main rotor vibration isolation system 924 and/or wing vibration isolation system 914 so that the isolation frequency of each active LIVE™ unit can be actively modified during operation. Active vibration control system 942 is configured to detect and convey vibration data through vibration feedback sensors 944a, 944b, 944c, 944d to regulate the isolation frequency of at least one active LIVE™ unit in main rotor vibration isolation system 924 and/or wing vibration isolation system 914.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A compound helicopter comprising:
   a fuselage including a fuselage airframe;
   a translational thrust system coupled to the fuselage airframe;
   a pylon assembly including a dual rotor system having coaxially disposed top and bottom rotor assemblies that counter rotate relative to one another, the pylon assembly vibrating at a blade passage (bp) frequency and a 2×blade passage (2 bp) frequency;
   a dual rotor vibration isolation system including a plurality of multi-frequency liquid inertia vibration eliminator units each having two or more isolation frequencies including the bp frequency and the 2 bp frequency, the plurality of multi-frequency liquid inertia vibration eliminator units coupled between the fuselage airframe and the pylon assembly to reduce transmission of the pylon assembly vibration to the fuselage airframe at the bp frequency and the 2 bp frequency;
   a wing subject to rotorwash-induced vibration from the dual rotor system, the wing including a wing airframe; and
   a wing vibration isolation system including a plurality of links coupled between the wing airframe and the fuselage airframe, each link including a liquid inertia vibration eliminator unit configured to reduce transmission of the rotorwash-induced wing vibration to the fuselage airframe, the plurality of links comprising a first vertically-oriented left link, a first vertically-oriented right link and a first diagonally-oriented link interposed between the first vertically-oriented left link and the first vertically-oriented right link.

2. The compound helicopter as recited in claim 1 wherein the wing vibration isolation system further comprises one or more supplementary vibration management devices including one or more devices selected from the group consisting of a Frahm, an active hub shaker, an active force generator, a pendulum and a hub active vibration control system.

3. The compound helicopter as recited in claim 1 wherein each liquid inertia vibration eliminator unit of the wing vibration isolation system comprises at least one liquid inertia vibration eliminator unit selected from the group consisting of a passive liquid inertia vibration eliminator unit and an active liquid inertia vibration eliminator unit.

4. The compound helicopter as recited in claim 1 wherein the wing airframe includes one or more spars; and
   wherein each link of the wing vibration isolation system is coupled between one of the spars and the fuselage airframe.

5. The compound helicopter as recited in claim 1 wherein the wing airframe includes front and aft spars; and
   wherein, the fuselage airframe includes left and right support beams.

6. The compound helicopter as recited in claim 5 wherein the first vertically-oriented left link is coupled between the left support beam and the front spar; and
   wherein the first vertically-oriented right link is coupled between the right support beam and the front spar.

7. The compound helicopter as recited in claim 5 wherein the first vertically-oriented left link is coupled between the left support beam and the aft spar; and
   wherein the first vertically-oriented right link is coupled between the right support beam and the aft spar.

8. The compound helicopter as recited in claim 5 wherein the plurality of links further comprises a second vertically-oriented left link and a second vertically-oriented right link;
   wherein the first vertically-oriented left link is coupled between the left support beam and the front spar;
   wherein the first vertically-oriented right link is coupled between the right support beam and the front spar;
   wherein the second vertically-oriented left link is coupled between the left support beam and the aft spar; and
   wherein the second vertically-oriented right link is coupled between the right support beam and the aft spar.

9. The compound helicopter as recited in claim 8 wherein the plurality of links further comprises second and third diagonally-oriented links;
   wherein the second diagonally-oriented link is interposed between the first and second vertically-oriented left links; and
   wherein the third diagonally-oriented link is interposed between the first and second vertically-oriented right links.

10. The compound helicopter as recited in claim 5 wherein the first diagonally-oriented link has a length equal to or greater than a distance between the left and right support beams.

11. The compound helicopter as recited in claim 1 wherein the first diagonally-oriented link spans a width of the fuselage.

\* \* \* \* \*